US006450104B1

(12) United States Patent
Grant et al.

(10) Patent No.: US 6,450,104 B1
(45) Date of Patent: Sep. 17, 2002

(54) MODULAR OBSERVATION CRAWLER AND SENSING INSTRUMENT AND METHOD FOR OPERATING SAME

(75) Inventors: Edward Grant, Raleigh; John F. Muth, Cary; John Steven Cottle, Raleigh, all of NC (US); Brian Ellery Dessent, Oakland, CA (US); Jason Alan Cox, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/560,478

(22) Filed: Apr. 28, 2000

(51) Int. Cl.[7] ............................................... B61B 13/00
(52) U.S. Cl. ............................... 104/138.2; 104/138.1; 73/865.8; 74/110; 105/365
(58) Field of Search .................... 104/138.2, 138.1; 105/365; 73/865.8; 74/110

(56) References Cited

U.S. PATENT DOCUMENTS

| | | | | |
|---|---|---|---|---|
| 2,738,748 A | * | 3/1956 | Hecht | ........................... 74/110 |
| 2,884,573 A | * | 4/1959 | Watson | ........................ 74/110 |
| 4,601,204 A | * | 7/1986 | Fournot et al. | ........... 104/138.2 |
| 4,770,105 A | | 9/1988 | Takagi et al. | |
| 4,848,168 A | * | 7/1989 | Negishi | ...................... 73/865.8 |
| 4,862,808 A | | 9/1989 | Hedgcoxe et al. | |
| 4,919,223 A | * | 4/1990 | Egger et al. | .................. 180/8.1 |
| 4,922,436 A | * | 5/1990 | Dohm et al. | ................... 81/470 |
| 4,938,081 A | | 7/1990 | Negishi | |
| 4,953,412 A | | 9/1990 | Rosenberg et al. | |
| 5,018,451 A | | 5/1991 | Hapstack | |
| 5,080,020 A | | 1/1992 | Negishi | |
| 5,121,694 A | | 6/1992 | Zollinger | |
| 5,293,823 A | * | 3/1994 | Box | ......................... 104/138.2 |
| 5,386,741 A | | 2/1995 | Rennex | |
| 5,497,707 A | | 3/1996 | Box | |
| 5,574,347 A | | 11/1996 | Neubauer | |
| 5,601,025 A | | 2/1997 | Box | |
| 5,747,998 A | | 5/1998 | Fowler et al. | |
| 5,791,255 A | | 8/1998 | Box | |
| 5,795,101 A | * | 8/1998 | Bill | ............................ 405/154 |
| 5,878,783 A | * | 3/1999 | Smart | ....................... 104/138.2 |
| 5,947,213 A | * | 9/1999 | Angle et al. | ................... 175/24 |

FOREIGN PATENT DOCUMENTS

JP  02060875 A  *  3/1990  ........... B61B/13/00

OTHER PUBLICATIONS

Idogaki et al., "Characteristics of Piezoelectric Locomotive Mechanism for an In–Pipe Micro Inspection Machine," Sixth International Symposium on Micro Machine and Human Science, (1995).

* cited by examiner

*Primary Examiner*—S. Joseph Morano
*Assistant Examiner*—Frantz F. Jules
(74) *Attorney, Agent, or Firm*—Jenkins & Wilson, P.A.

(57) ABSTRACT

A robotic apparatus adapted for locomotion in an enclosed space such as a pipe includes a combination of articulated gripping and locomotive modules. Each gripping module includes an actuator mechanically linked to gripping members such that axial forces produced by the actuator are translated to radial forces in the gripping members, whereby the gripping members are caused to alternately hold and release the engagement of the robotic apparatus with surfaces of the enclosed space. Each locomotive module includes one or more actuators adapted to alternatively expand and contract the length of the locomotive module. The sequence of operations of the gripping and locomotive modules can be controlled such that the robotic apparatus can crawl through the enclosed space in an inchworm-like fashion and is capable of navigating turns and traversing inclines.

49 Claims, 17 Drawing Sheets

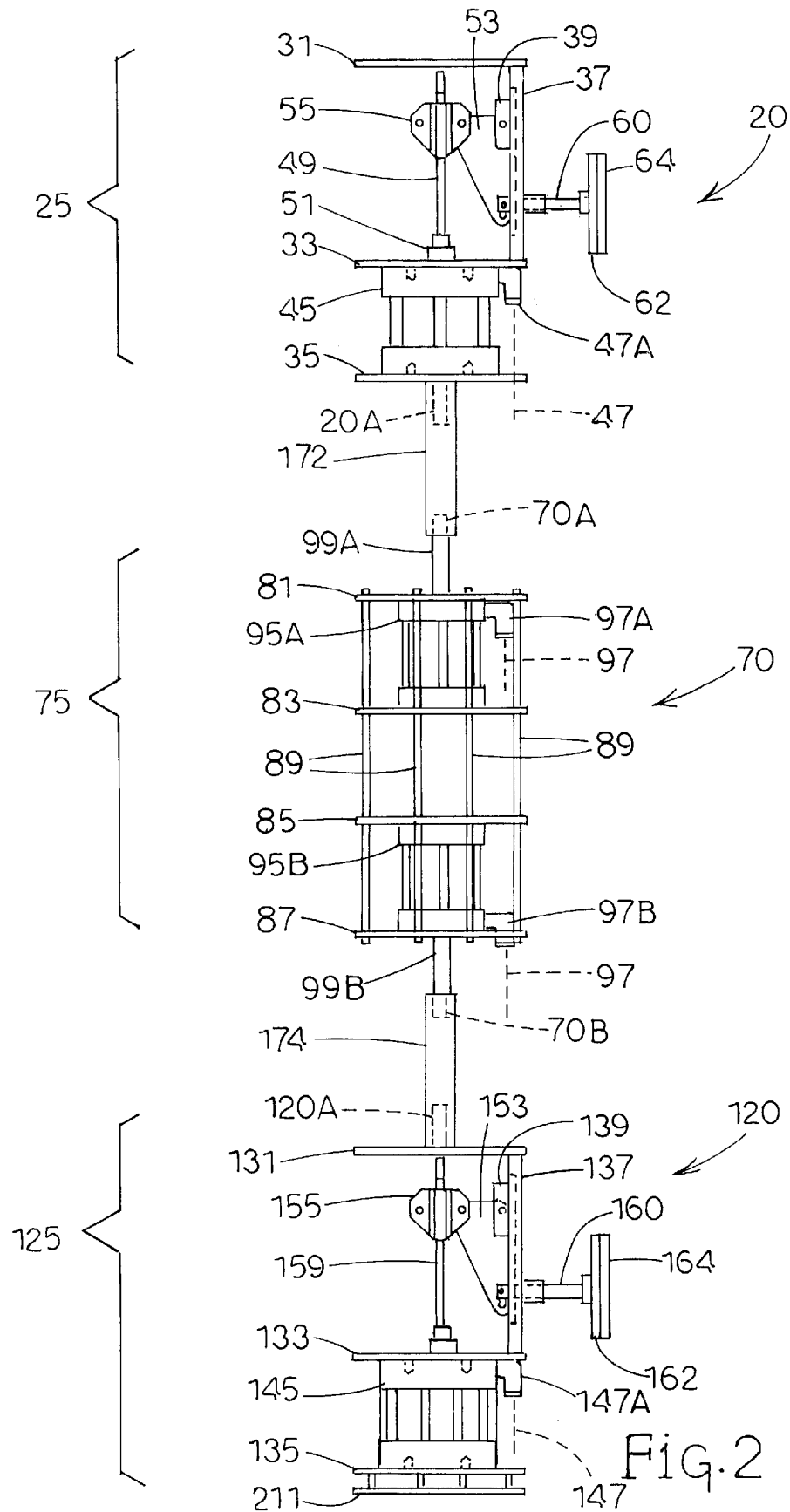

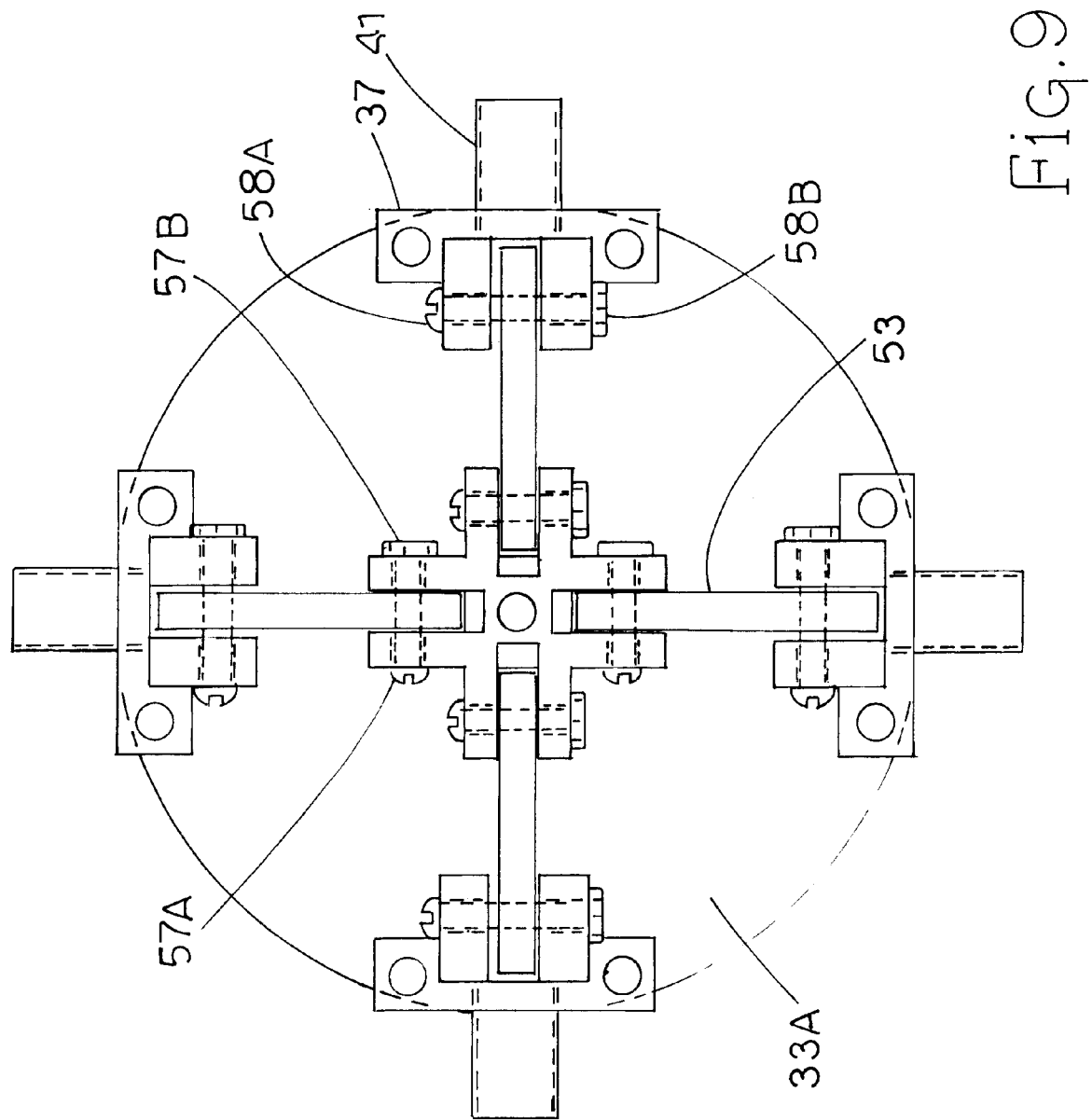

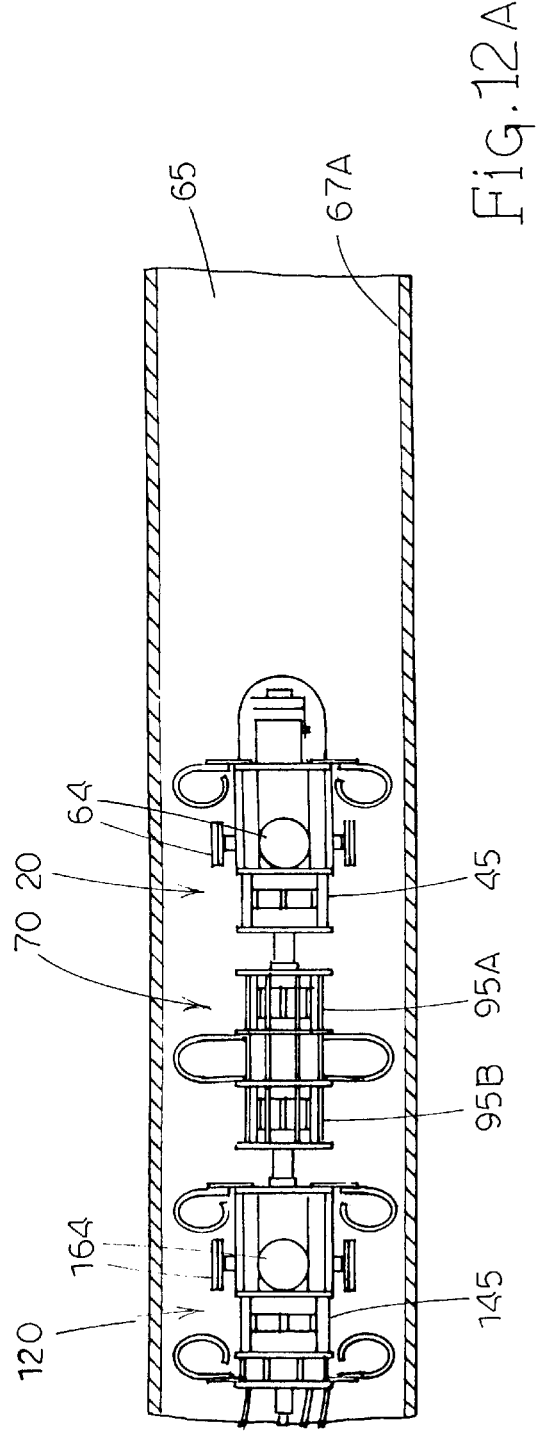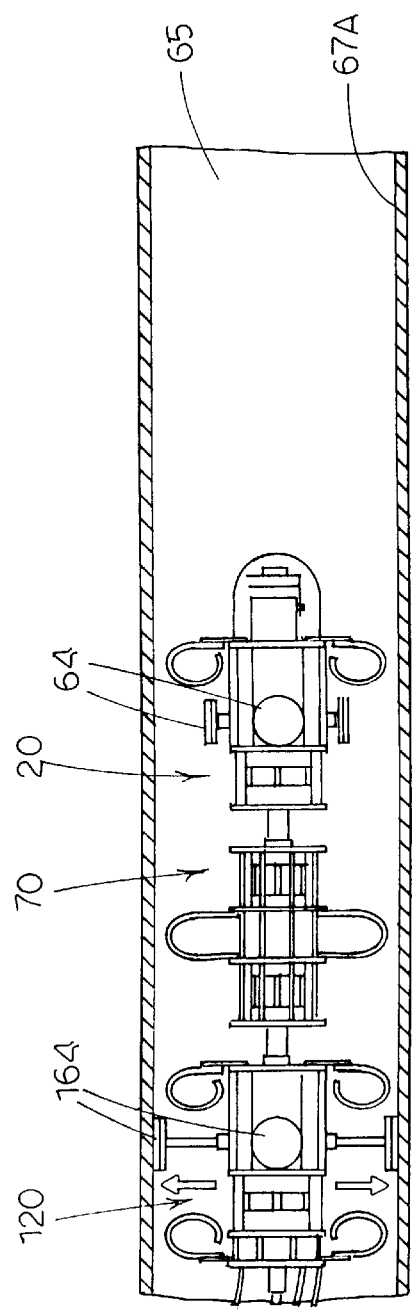

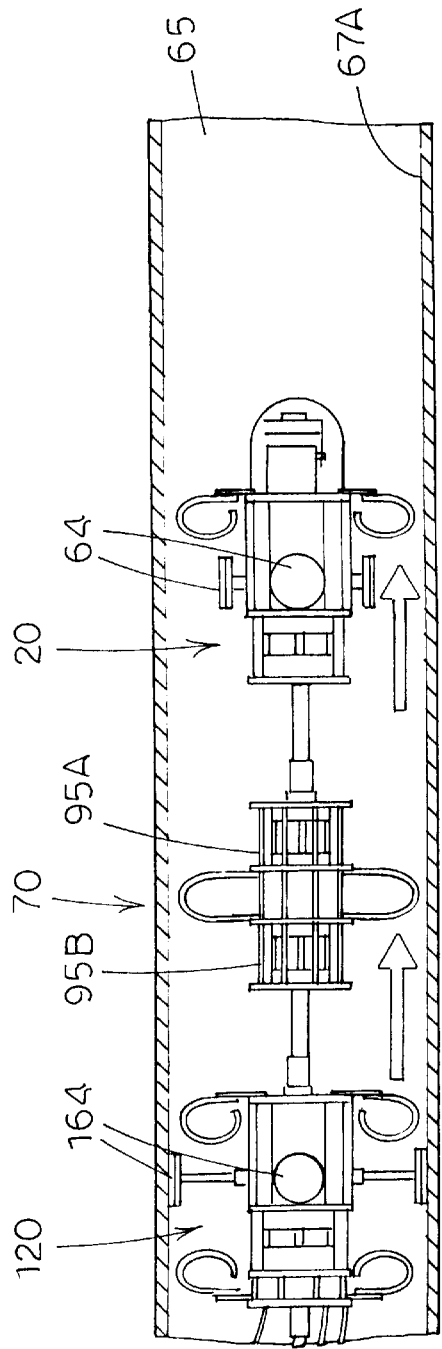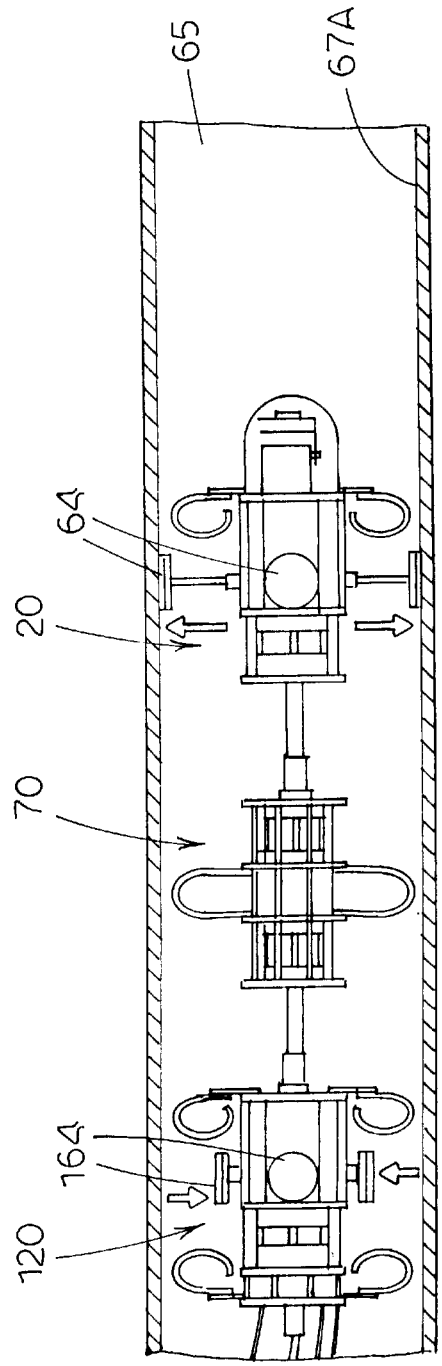
Fig. 12C
Fig. 12D

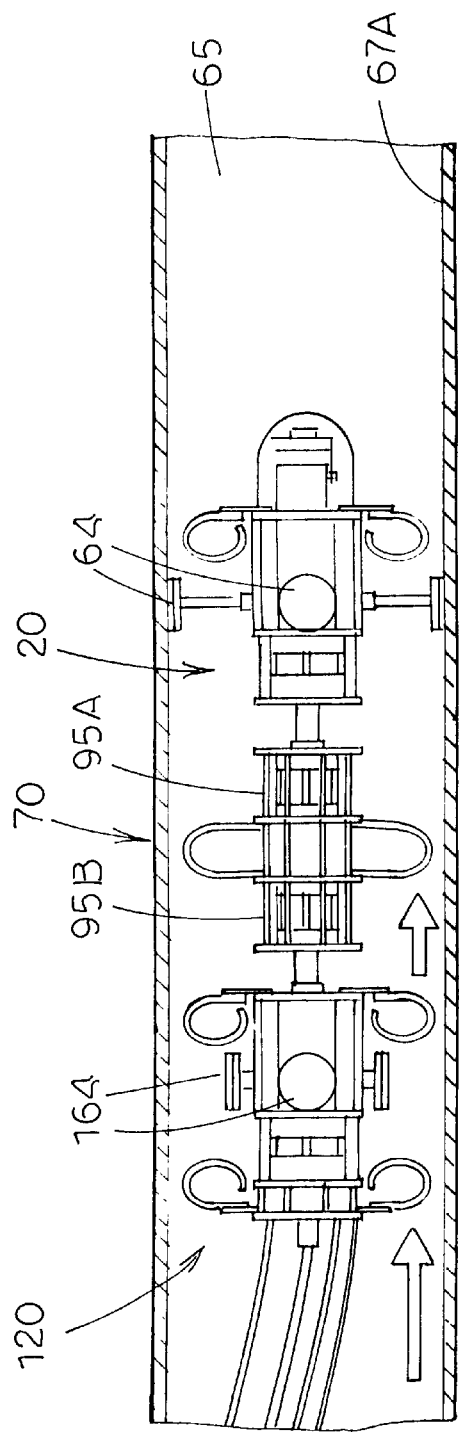
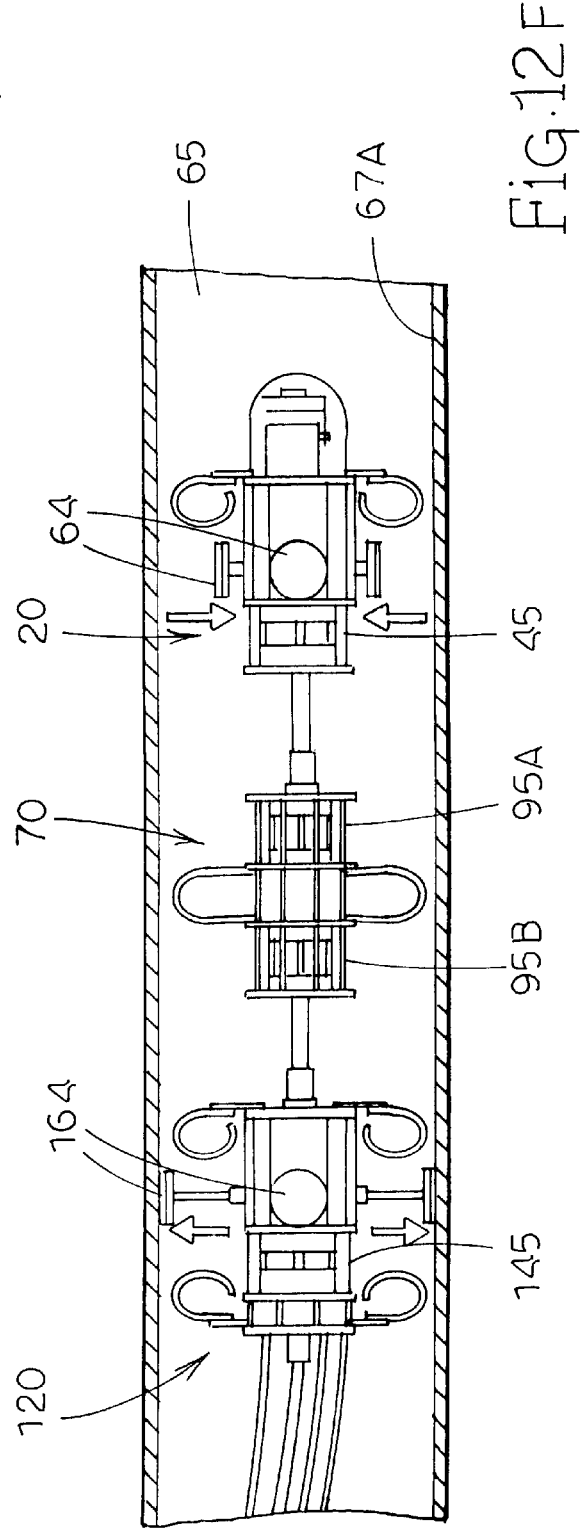

MODULAR OBSERVATION CRAWLER AND SENSING INSTRUMENT AND METHOD FOR OPERATING SAME

TECHNICAL FIELD

The present invention is generally directed to a robotic apparatus and, more particularly, to a remotely controlled robotic apparatus adapted to travel through enclosed spaces such as pipes or ducts using mechanically enabled inchworm-like motions.

BACKGROUND ART

The use of robotic devices and particularly robotic vehicles has become increasingly important in recent years as researchers seek to develop new and improved methods for carrying out remote or hazardous tasks with minimal human effort. A wide variety of tasks are envisioned for robotic devices.

For example, search-and-rescue, damage assessment and other information-gathering operations could be carried out by robotic vehicles at sites such as a buildings damaged by earthquakes or bombings. When rescuers and members of disaster teams approach a collapsed building or other structure, they face the difficulty of trying to rescue the survivors they have located without accidentally injuring those they have not yet found. In the rubble of a large building, it is difficult to know where survivors are trapped and rescuers sometimes risk their own lives climbing into the rubble to find the survivors. Because pipes and other enclosed conduits are often left intact when buildings collapse, a robotic vehicle could be used to navigate the pipes in order to move through the buildings. Similarly, robotic vehicles could be employed in hostage situations to travel through HVAC ductwork or plumbing systems in order to gather intelligence on the terrorists and their hostage victims. In other examples, robotic vehicles could be used to perform inspection and maintenance tasks, and to carry out non-destructive testing, in remote or hazardous locations such as nuclear power plant pipes and gas or water lines.

In performing any of the foregoing tasks, the design of the robotic vehicle should permit a number of different kinds of instruments and sensors to be installed thereon. For example, accelerometers could be used to detect vibrations made by a survivor's tapping on pipes. Speakers could be used to output music or messages to provide comfort and information to victims. Microphones could be used to pick-up various informative sounds within a building or the conduit of the building through which the robotic vehicle travels. Video cameras could be used to enable the operators of the robotic apparatus to detect cracks or scaling in a pipe, or to view the area outside the end of a conduit such as by viewing a room from the vantage point of a vent. Video cameras could also be used to assist maintenance personnel in mapping out the layout of an unknown system of pipes or ducts. Other sensors include infrared sensors to detect heat, chemical monitors such as electronic noses to detect gas leaks or oxygen or pH concentration, tactile sensors, radio-activity sensors, and the like. Instruments include sampling devices, gripping devices, manipulative arms, and other task-specific tools. In one example, a robotic vehicle equipped with a gripping device could be used to pull the ends of wires and cables through a length of electrical conduit.

Various robotic vehicular devices have heretofore been developed. U.S. Pat. Nos. 5,293,823 and 5,497,707 to Box disclose a robotic apparatus wherein inflatable bladders are used to engage the inside surface of a pipe and three tubular bellows are used to move and turn the robotic apparatus through the pipe. U.S. Pat. Nos. 5,601,025 and 5,791,255 to Box disclose a robotic apparatus wherein radially extendable shoes and pivotable arcuate arms are actuated by pistons to engage the inside surface of a pipe. U.S. Pat. No. 5,121,694 to Zollinger discloses a robotic apparatus wherein air cylinders are used to expand and contract its length and to extend and retract leg members to engage the inside surface of a pipe. U.S. Pat. No. 5,018,451 to Hapstack also discloses a robotic apparatus wherein air cylinders are used to expand and contract its length and to extend and retract legs for engaging the inside surface of a pipe. U.S. Pat. Nos. 5,080,020; 4,938,081 and 4,848,168 to Negishi disclose a robotic apparatus wherein inflatable elastic elements are used to expand and contract the robotic apparatus and engage the inside surface of a pipe. U.S. Pat. No. 4,770,105 to Takagi et al. discloses a robotic apparatus wherein motor-driven continuous treads are used to engage the inside surface of a pipe and move the robotic apparatus therethrough. U.S. Pat. No. 4,862,808 to Hedgcoxe et al. discloses a robotic apparatus using a combination of motor-driven and idler wheels to engage the inside surface of a pipe and transport the robotic apparatus therethrough.

In *Micro Inspection Robot for 1-in. Pipes*, IEEE/ASME TRANSACTIONS ON MECHATRONICS, Vol. 4, No. 3, September 1999, Suzumori et al. disclose a robotic apparatus using electromagnetic motor-driven planetary gear and wheel assemblies to engage the inside surface of a pipe and transport the robotic apparatus therethrough. Robotic devices employing inchworm-like or snake-like motion in endoscopic or other miniaturized applications are disclosed in U.S. Pat. No. 5,386,741 to Rennex; U.S. Pat. No. 5,906,491 to Dario et al.: and in an IEEE publication entitled *Characteristics of Piezoelectric Locomotive Mechanism foran In-Pipe Micro Inspection Machine*, SIXTH INTERNATIONAL SYMPOSIUM ON MICRO MACHINE AND HUMAN SCIENCE, 1995, by Idogaki. Other robotic-like devices adapted to move through pipes are disclosed in U.S. Pat. Nos. 5,574,347 to Newbauer and U.S. Pat. No. 6,026,911 to Angle et al.

Factors such as complexity, efficiency and practicality are some of the impediments to developing robotic solutions that can lead to general acceptance within a given industry. The present invention is a development in the field of biorobotics, which generally is a study of advanced robotics based on biological or physiological models. The biorobotic approach considers that biological and physiological models offer appropriate directions for inquiry by mankind, since such models have been selected, developed and tested by natural mechanisms over great spans of time. The challenge rests in emulating such models in the form of man-made implementations, while at the same time preventing such implementations from becoming so mechanically complex or energy-dependent that insufficient practicality and utility results therefrom.

Accordingly, the present invention finds a solution in the mechanical emulation of the crawling motion of an inchworm or caterpillar. While some of the robotic devices disclosed in the above-cited references emulate inchworm-like motion, it is acknowledged by those skilled in the art that there is much room for further improvement. The present invention is considered as providing an efficient, simplified and practicable solution to the problems associated with robotic vehicles designed to traverse enclosed spaces.

DISCLOSURE OF THE INVENTION

The present invention provides a robot adapted to crawl through pipes by performing inchworm or caterpillar-like movements. Moreover, the robot is adapted to crawl in both forward and reverse directions as well as along horizontal, sloped and vertical planes. Still further, the robot is adapted to maneuver right-angle turns, not only by turning left or right in the horizontal plane but also by turning up or down between horizontal and vertical planes.

Accordingly, the present invention provides a robotic apparatus adapted for locomotion in an enclosed space comprising a front segment, a medial segment, and a rear segment. The front segment includes a front work-energy transfer device mounted thereto in operative communication with a power supply source. A plurality of front radial displacement members extend radially outwardly with respect to the front segment. A plurality of front gripping members are also included. Each front gripping member is attached to a corresponding one of the plurality of front radial displacement members. A front mechanical linkage interconnects the front work-energy transfer device and each front radial displacement member in order to translate axial motion of the front work-energy transfer device into radial motion of each front radial displacement member.

The medial segment includes first and second medial work-energy transfer devices mounted thereto in operative communication with the power supply source. The first medial work-energy transfer device includes a first axial translation member. The second medial work-energy transfer device includes a second axial translation member disposed in opposing axial relation to the first axial translation member in order to enable expansion and contraction of an overall length of the medial segment.

The rear segment includes a rear work-energy transfer device mounted thereto in operative communication with the power supply source. A plurality of rear radial displacement members extend radially outwardly with respect to the rear segment. The rear segment also includes a plurality of rear gripping members, each rear gripping member being attached to a corresponding one of the plurality of rear radial displacement members. A rear mechanical linkage interconnects the rear work-transfer device and each rear radial displacement member in order to translate axial motion of the rear work-energy transfer device into radial motion of each rear radial displacement member. A first flexible coupling interconnects the front segment and the first axial translation member of the medial segment, and a second flexible coupling interconnects the second axial translation member of the medial segment and the rear segment.

In another embodiment according to the present invention, a robotic apparatus adapted for locomotion in an enclosed space comprises a plurality of leveraging segments and a plurality of locomotive segments. Each leveraging segment includes a leveraging segment work-energy transfer device mounted thereto in operative communication with a power supply source. A plurality of radial displacement members extend radially outwardly with respect to the leveraging segment. Each leveraging segment also includes a plurality of gripping members, each gripping member being attached to a corresponding one of the plurality of radial displacement members. A mechanical linkage interconnects the leveraging segment work-energy transfer device and each radial displacement member in order to translate axial motion of the leveraging segment work-energy transfer device into radial motion of each radial displacement member. Each locomotive segment includes first and second locomotive segment work-energy transfer devices mounted thereto in operative communication with the power supply source. The first locomotive segment work-energy transfer device includes a first displacement member. The second locomotive segment work-energy transfer device includes a second displacement member disposed in opposing axial relation to the first displacement member in order to enable expansion and contraction of an overall length of the medial segment. A plurality of flexible couplings interconnect the leveraging segments and the first and second displacement members of the locomotive segments.

In a further embodiment according to the present invention, a robotic apparatus adapted for locomotion in an enclosed space comprises a front segment, a medial segment, and a rear segment. The front segment includes a front frame and a front work-energy transfer device mounted to the front frame in operative communication with a power supply source. The front work-energy transfer device includes a front displacement member. A plurality of front leg members extend radially outwardly with respect to a central longitudinal axis of the front segment. The front segment also includes a plurality of front foot members. Each front foot member includes a frictional surface and is attached to a corresponding one of the plurality of front leg members. A front mechanical linkage interconnects the front displacement member and each front leg member in order to translate axial motion of the front displacement member into radial motion of each front leg member.

The medial segment includes a medial frame and first and second medial work-energy transfer devices mounted to the medial frame in operative communication with the power supply source. The first medial work-energy device includes a first medial displacement member, and the second medial work-energy transfer device includes a second medial displacement member. A first flexible coupling interconnects the front segment and the medial segment.

The rear segment includes a rearframe and a rear work-energy transfer device mounted to the rear frame In operative communication with the power supply source. The rear work-energy transfer device includes a rear displacement member. A plurality of rear leg members extend radially outwardly with respect to a central longitudinal axis of the rear segment. The rear segment also includes a plurality of rear foot members. Each rear foot member includes a frictional surface and is attached to a corresponding one of the plurality of rear leg members. A rear mechanical linkage interconnects the rear displacement and each rear leg member in order to translate axial motion of the rear displacement member into radial motion of each rear leg member. A second flexible coupling interconnects the medial segment and the rear segment.

The present invention also provides a system for controlling locomotion of a robotic apparatus through an enclosed space. The system comprises an actuation power supply source, a robotic apparatus, and first and second control modules. The robotic apparatus includes at least two gripping modules and a locomotive module interconnecting the gripping modules. Each gripping module includes a gripping power transfer device communicating with the actuation power supply source, a plurality of radially disposed reciprocative gripping members, and a mechanical linkage interconnecting the gripping power transfer device and the gripping members. Each locomotive module includes one or more locomotive power transfer devices communicating with the actuation power supply source. The locomotive power transfer device operates to alternately expand and contract an overall length of the locomotive module. The first control module controls a flow of an actuation power medium from the actuation power supply source to the gripping and locomotive power transfer devices. The second control module controls an operational sequence of the gripping and locomotive power transfer devices. The first control module is responsive to signals communicated thereto from the second control module.

The present invention additionally provides a method for enabling a robotic apparatus to travel through an enclosed space. In this method, a robotic apparatus is provided with front and rear gripping modules, a locomotive module, a first flexible coupling interconnecting the front gripping module and the locomotive module, and a second flexible coupling interconnecting the rear gripping module and the locomotive module. The front gripping module is provided with a plurality of radially disposed front gripping members powered by an actuation power supply source, and the rear gripping module is provided with a plurality of radially disposed rear gripping members powered by an actuation power supply source. The locomotive module is provided with a reciprocative assembly powered by the actuation power supply source. The robotic apparatus is caused to execute a sequence of actuating steps. As part of these actuating steps, each of the front and rear gripping members is caused to alternately extend and retract. In addition, the reciprocative assembly is caused to alternately expand and contract an overall length of the locomotive module in order to increase and decrease respective overall distances between the locomotive module and the front gripping module and between the locomotive module and the rear gripping module.

The present invention also provides a computer program product comprising computer-executable instructions embodied in a computer-readable medium for performing the following steps. A front gripping mechanism of a robotic apparatus is caused to alternately extend and retract in order to engage and disengage the robotic apparatus with a wall of an enclosed space. A rear gripping mechanism of the robotic apparatus is caused to alternately extend and retract to engage and disengage the robotic apparatus with the wall of the enclosed space. A reciprocative assembly of the robotic apparatus is caused to alternately expand and contract an overall length of the robotic apparatus whereby the robotic apparatus crawls through the enclosed space.

In the present invention, it is preferred that the work-energy transfer devices take the form of pneumatic actuators powered by compressed air. The use of compressed air as a power medium is useful when it is desired to avoid stray sparks that could ignite flammable substances, explosive gases or other combustibles in the environment.

The modular nature of the robotic apparatus according to the present invention permits a variety of instruments and sensors to be added thereto. Such instruments and sensors can be mounted to various locations on the segments or framework of the robotic apparatus, or can be included as part of a nose module mounted to the front segment.

Accordingly, it is an object of the present invention to provide a robotic apparatus capable of traveling through enclosed spaces such as pipes and ductwork.

It is another object of the present invention to provide a robotic apparatus capable of traveling through inclined and even vertical courses of enclosed spaces, and capable of maneuvering through turns in such courses.

It is a further object of the present invention to provide a robotic apparatus characterized by a modular design such that a number of enclosure-gripping, locomotive, sensing and instrumental modules can be selected for incorporation into the robotic apparatus, and can be easily added to or removed from the robotic apparatus as well as interchanged with other modules of the robotic apparatus.

It is yet another object of the present invention to provide a robotic apparatus characterized by a relatively simple mechanical design such that the risk of operational failure during critical tasks of the robotic apparatus is minimized.

It is a still further object of the present invention to provide a robotic apparatus adapted to crawl through an enclosed space in an inchworm-like motion by translating axial actuating motion into radial actuating motion.

It is an additional object of the present invention to provide a robotic apparatus whose motion and operations can be remotely controlled by a user through the use of a tether or umbilical line.

Some of the objects of the invention having been stated hereinabove, other objects will become evident as the description proceeds when taken in connection with the accompanying drawings as best described hereinbelow.

BRIEF DESCRIPTION OF THE DRAWINGS

FIG. 2 is a top plan view illustrating several mechanical details of the robotic apparatus of FIG. 1;

FIG. 9 is a front plan view of a mechanical linkage of the robotic apparatus in FIG. 1 shown in assembled form in accordance with the present invention;

FIGS. 12A, 12B, 12C, 12D, 12E and 12F are respective sequential views of the robotic apparatus of FIG. 1 illustrating the movement of the robotic apparatus within a pipe in accordance with the present invention;

DETAILED DESCRIPTION OF THE INVENTION

The present invention will now be described in the context of its mechanical, control hardware, and software designs.

MECHANICAL DESIGN OF ROBOTIC APPARATUS

Figure 1:
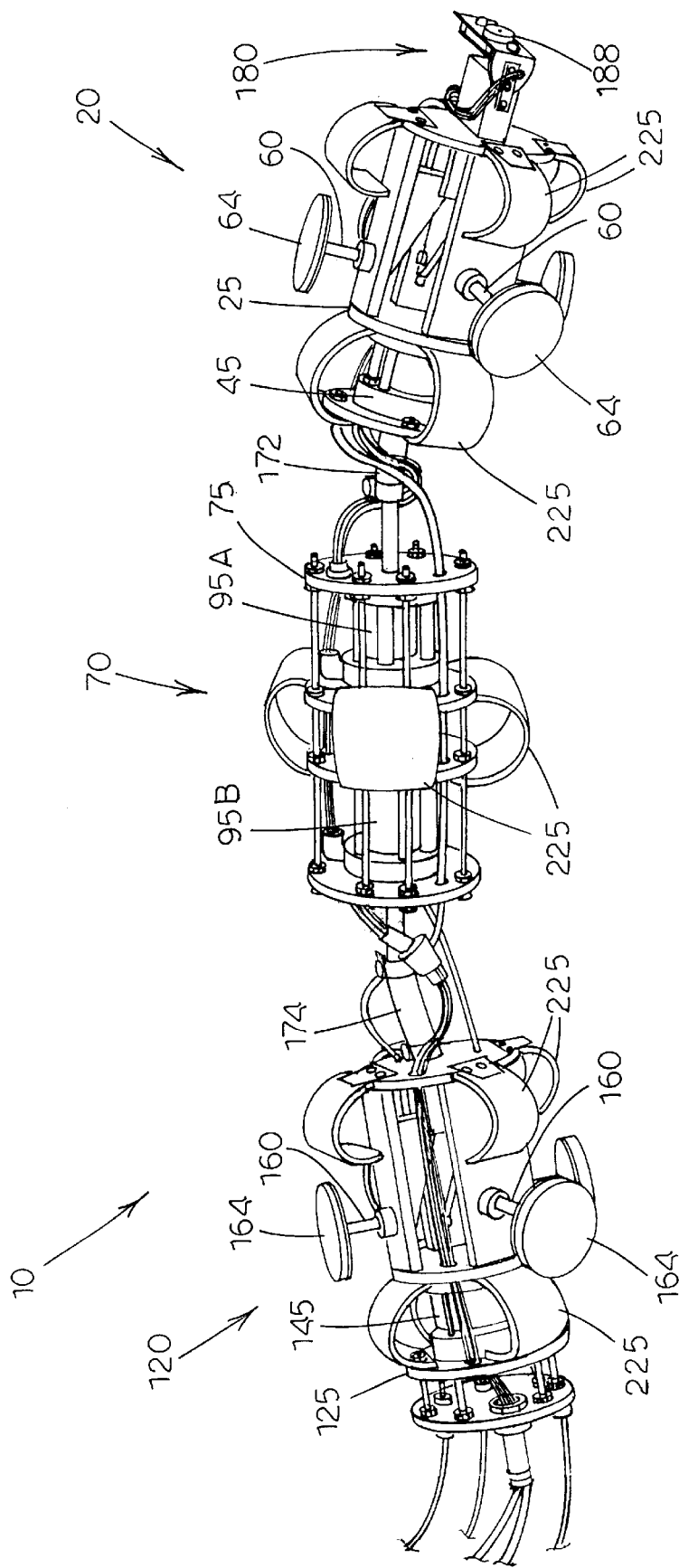
FIG. 1 is a perspective view of a robotic apparatus provided in accordance with the present invention.

Referring to FIG. 1, the present invention provides a pipe-crawling robot generally designated 10. Robot 10 generally consists of at least three independently modular, articulated segments. Thus, a front or leading segment is generally designated 20, a medial segment is generally designated 70, and a rear or trailing segment is generally designated 120. Front and rear segments 20 and 120 can be characterized as stabilizing, gripping or leveraging modules, and medial segment 70 can be characterized as a locomotive module. Front segment 20 and medial segments 70 are connected by a first flexible coupling 172, and medial segment 70 and rear segment 120 are connected by a second flexible coupling 174. Robot 10 also includes a head or nose module generally designated 180 mounted to front segment 20, which can include a variety of useful instruments and sensors such as a servo-operated video camera 188.

As described more fully hereinbelow, front segment 20, medial segment 70 and rear segment 120 include respective front, medial and rear frameworks 25, 75 and 125. Each framework 25, 75 and 125 preferably has a skeletal-like design in order to minimize the overall mass of robot 10. In addition, front and rear segments 20 and 120 include respective front and rear work-energy transfer devices 45 and 145, and medial segment 70 includes two medial work-energy transfer devices 95A and 95B. Work-energy transfer devices 45, 95A and 145 can be any devices adapted to transfer energy in the form of mechanical work as a function of force and distance. For this purpose, each work-energy transfer device 45, 95A, 95B and 145 is preferably some type of linear actuator.

Each of front and rear segments 20 and 120 also includes a plurality of bronchial appendages, preferably four in number and equally spaced around the respective circumferences of front and rear segments 20 and 120. Thus, front and rear segments 20 and 120 include respective front and rear legs 60 and 160 operatively connected to front and rear work-energy transfer devices 45 and 145 by novel mechanical linkages to be described hereinbelow. Each of front and rear legs 60 and 160 terminates at a foot plate 62, 162 (see FIG. 2) on which is attached a foot or pressure pad 64,164. When in an extended position, pressure pads 64 and 164 collectively permit robot 10 to grip the inside walls of an enclosed space such as a pipe, duct or other conduit, such that robot 10 can hold its position therein. Pads 64 and 164 are preferably constructed from a resilient, frictional material such as neoprene.

Finally, a plurality of smooth-surfaced bumpers 225 are attached to various sites on front and rear frameworks 25 and 125 to assist robot 10 in maintaining a substantially centered position within the pipe or other enclosed space and in negotiating turns in the pipe, as well as to prevent robot 10 from becoming stuck in cracks in the pipe. Preferably, bumpers 225 are constructed of a strong yet somewhat resilient material. Elements other than bumpers 225 could be employed for this purpose, such as caster wheels or pivotable skid plates.

It will be understood that robot 10 according to the present invention is not limited by the number of leveraging and locomotive modules, nor by the particular ordinal configuration of the leveraging and locomotive modules illustrated in FIG. 1. Thus, additional front, medial and rear segments 20, 70 or 120 can be provided. Moreover, two or more front or rear segments 20 or 120 can be operatively disposed adjacent to each other in order to realize increased leveraging power for robot 10. Also, two or more medial segments 70 can be operatively disposed adjacent to each other in order to realize increased locomotive power for robot 10. The particular number of leveraging and/or locomotive modules utilized, and the particular ordinal configuration utilized, will be dictated by various operational factors such as the types of enclosed space (e.g., pipe) through which robot 10 is to travel, the cross-sectional area of the enclosed space (e.g., inside diameter of the pipe), the condition of the inside surfaces of the enclosed space, the amount of sensing and/or manipulative instruments to be carried by robot 10, and the task to be performed by robot 10.

Figure 3A:
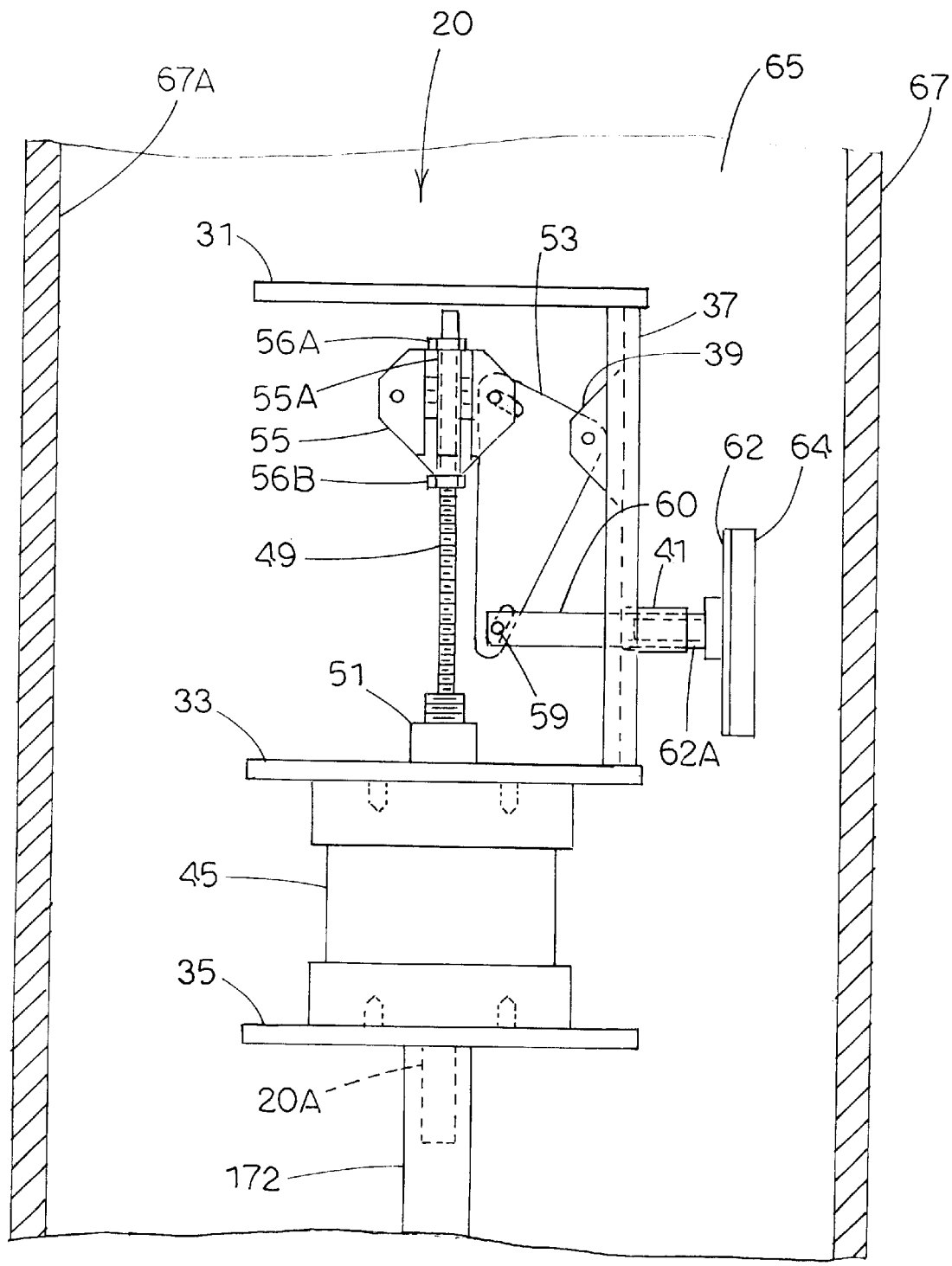
FIG. 3A is a top plan view of a gripping module of the robotic apparatus of FIG. 1 illustrated in a retracted position.
Figure 3B:
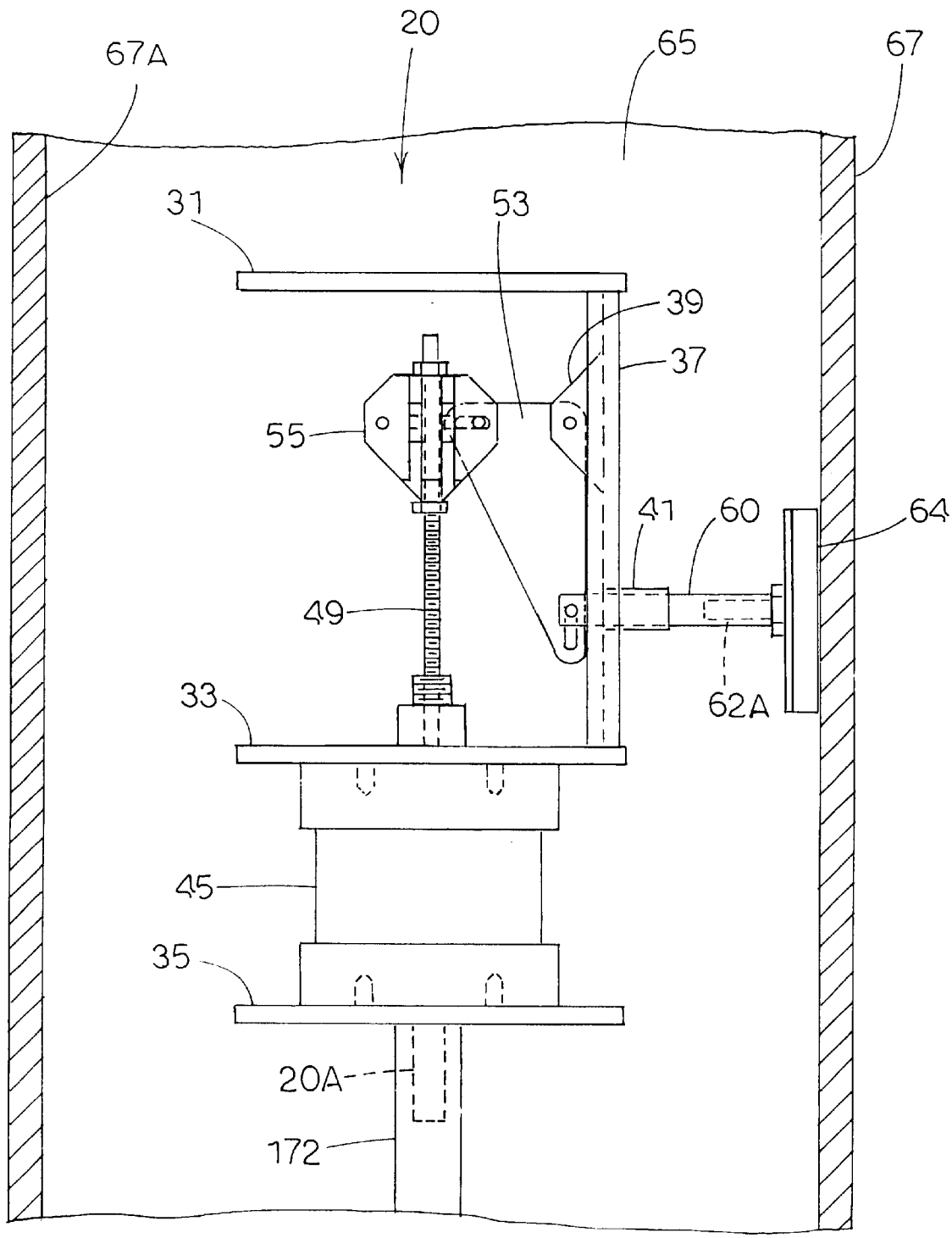
FIG. 3B is a top plan view of the gripping module of FIG. 3A illustrated in an extended position.
Figure 4:
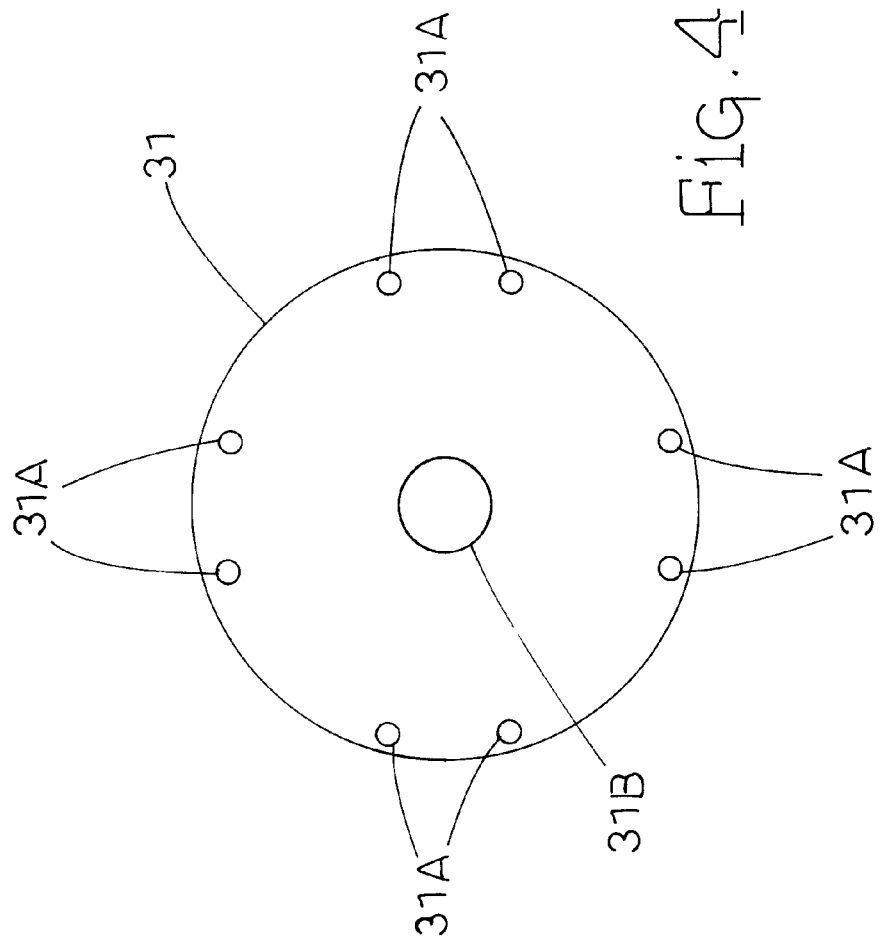
FIG. 4 is a front view of a structural support element of the robotic apparatus of FIG. 1.

Referring generally to FIGS. 2–11B, the mechanical details of robot 10 will now be described. Referring particularly to FIGS. 2, 3A and 3B, front framework 25 of front segment 20 includes first, second and third radial support plates 31, 33 and 35, respectively. FIG. 4 specifically depicts first radial support plate 31, but is representative of second and third radial support plates 33 and 35 as well. As shown in FIG. 4, each radial support plate 31, 33 and 35 has four pairs of through-holes 31A equally spaced around its perimeter as well as a central hole 31B. First and second radial support plates 31 and 33 are axially spaced from each other by four axial support plates 37. For clarity, only one axial support plate 37 is shown. FIGS. 5A, 5B and 5C illustrate the details of each axial support plate 37. As shown in the end view of FIG. 5C, each end of each axial support plate 37 includes a pair of threaded bores 37A. To secure each axial support plate 37 between first and second radial support plates 31 and 33, each pair of threaded bores 37A of each end of axial support plates 37 are respectively aligned with corresponding pairs of through-holes 31A of first and second radial support plates 31 and 33, and threaded fasteners such as bolts or screws (not shown) are fitted through through-holes 31A into threaded bores 37A.

Figure 5C:
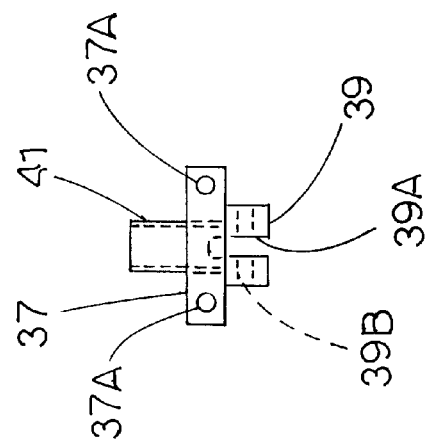
FIG. 5C is a top plan view of the structural support and mechanical linkage element of FIG. 5A.
Figure 5B:
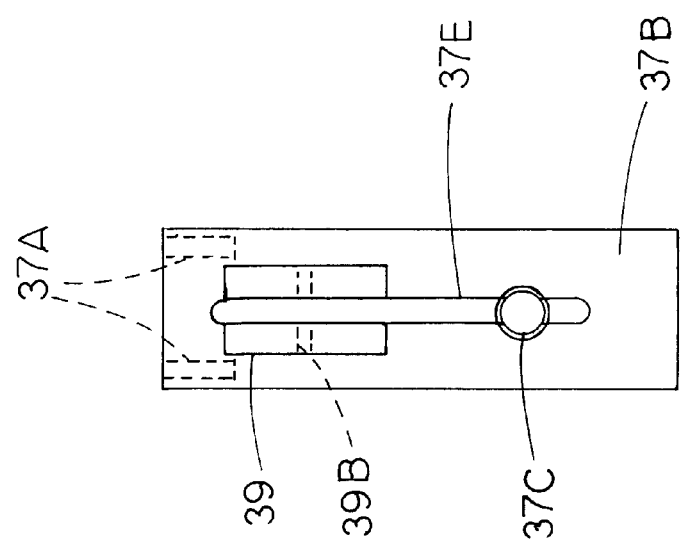
FIG. 5B is a front elevation view of the structural support and mechanical linkage element of FIG. 5A.
Figure 5A:
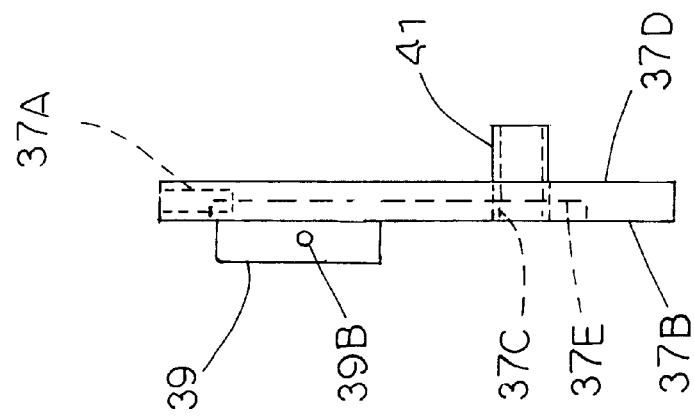
FIG. 5A is a side elevation view of a structural support and mechanical linkage element of the robotic apparatus of FIG. 1.

Each axial support plate 37 also includes a radial bracket 39 extending radially inwardly from an inside surface 37B of axial support plate 37, as shown in FIGS. 5A, 5B and 5C. Radial bracket 39 has a slot 39A and a connecting pin hole 39B extending transversely on either side of slot 39A. Each axial support plate 37 further includes a leg bore 37C. A collar 41 is attached to an outside surface 37D of axial support plate 37 in registry with leg bore 37C and extends radially outwardly therefrom. As described more fully hereinbelow, collar 41 serves as a guide for its corresponding front leg 60. In addition, each axial support plate 37 includes a slot 37E machined into its inside surface 37B.

Referring back to FIGS. 2, 3A and 3B, second and third radial support plates 33 and 35 are axially spaced from each other by front linear actuator 45 mounted therebetween. Front linear actuator 45 is mounted by securing fasteners (not shown) into front linear actuator 45 through appropriate holes (not shown) in second and third radial support plates 37 and 35. Preferably, front linear actuator 45 is a pneumatic cylinder to which compressed air is supplied over an air line 47 connected to a fitting 47A. A suitable pneumatic cylinder is available from BIMBA as Model No. FOR-090.5. Front linear actuator 45 includes an elongate member 49 such as a piston rod, which extends through central hole 31B of second radial support plate 33 and a coupling 51 in an axial direction towards first radial support plate 31.

Other alternative work-energy transfer devices could be implemented in the present invention, but are less preferred. Such other devices include a hydraulic actuator and an electromagnetic actuator or solenoid. In the case of a hydraulic actuator, a hydraulic line would be substituted for compressed air line 47 to supply hydraulic fluid from a hydraulic fluid supply source. In the case of a solenoid, electrical lead wires would be substituted to supply an operating voltage and elongate member 49 would take the form of a plunger.

Figure 6:
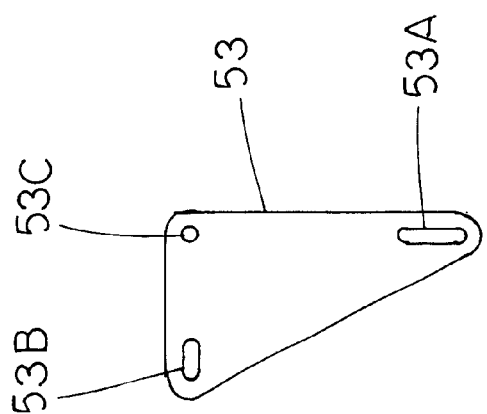
FIG. 6 is a side elevation view of another mechanical linkage element of the robotic apparatus of FIG. 1.
Figure 8A:
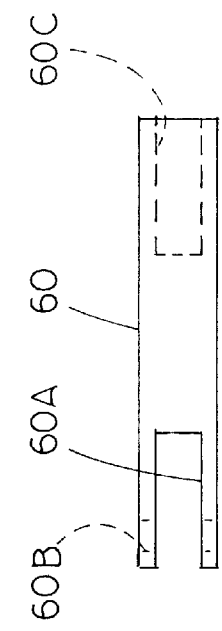
FIG. 8A is a top plan view of a leg member of the robotic apparatus of FIG. 1.
Figure 8B:
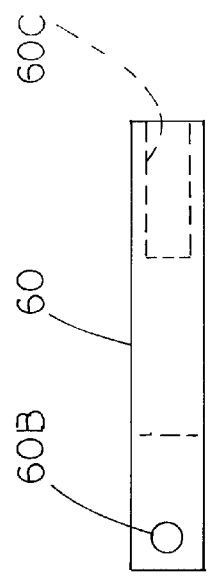
FIG. 8B is a side elevation view of the leg member of FIG. 8A.
Figure 7A:
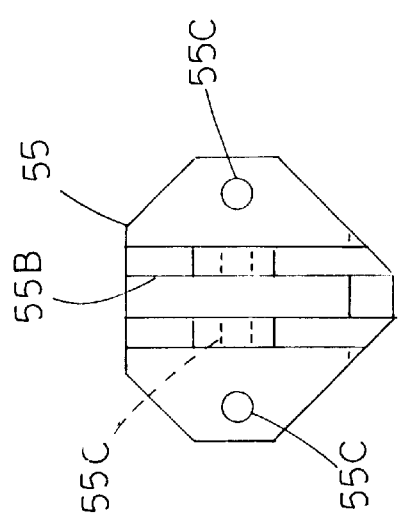
FIG. 7A is a top plan view of yet another mechanical linkage element of the robotic apparatus of FIG. 1.
Figure 7B:
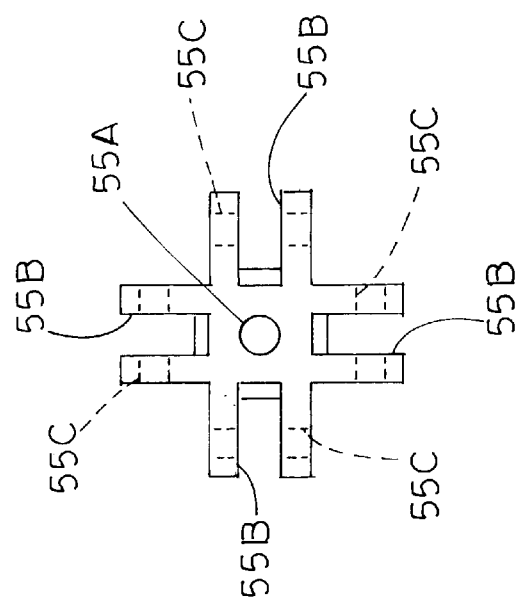
FIG. 7B is a front elevation view of the mechanical linkage element of FIG. 7A.

Referring to FIG. 6, front segment 20 also includes a force-transferring 90° or triangular bracket arm 53. In the preferred embodiment wherein four front legs and hence four axial support plates 37 are utilized, four triangular bracket arms 53 are likewise provided. Each triangular bracket arm 53 has a radial displacement slot 53A, an axial displacement slot 53B, and a pivot hole 53C disposed proximate to its respective vertices. Referring to FIGS. 7A and 7B, front segment 20 further includes a central bracket 55 having a central axial bore 55A. In the preferred embodiment, central bracket 55 includes four slots 55B and four connecting pin holes 55C extending transversely on either side of corresponding slots 55B. Referring to FIGS. 3A and 3B, central bracket 55 is disposed on elongate member 49 by extending elongate member 49 through axial bore 55A. Preferably, a portion of elongate member 49 is threaded such that central bracket 55 can be adjustably affixed onto elongate member 49 through the use of two nuts 56A and 56B. Referring to FIGS. 8A and 8B, one end of each front leg 60 has a slot 60A and a connecting pin hole 60B extending transversely with respect thereto. If desired, the other end of each front leg 60 can have a threaded bore 60C into which a post 62A with mating threads of corresponding foot plate 62 can be secured.

It can be seen from the foregoing description that front segment 20 provides a front mechanical linkage or interface between front linear actuator 45 and front legs 60. The front mechanical linkage is generally defined by central bracket 55, triangular bracket arms 53 and radial brackets 39.

The front mechanical linkage is constructed as follows. Referring to FIGS. 6, 7A and 9, axial displacement slot 53B of each triangular bracket arm 53 is aligned in corresponding slot 55B of central bracket 55, and a suitable connecting pin 57A such as a dowel or bolt is inserted through connecting pin hole 55C of central bracket 55 and through axial displacement slot 53B. Connecting pin 57A is loosely secured by a nut 57B. Referring to FIGS. 5C, 6 and 9, pivot hole 53C of each triangular bracket arm 53 is aligned in slot 39A of corresponding radial bracket 39, and a connecting pin 58A is inserted through connecting pin hole 39B of radial bracket 39 and through pivot hole 53C. Connecting pin 58A is loosely secured by a nut 58B. Referring to FIGS. 3A and 5A, each front leg 60, led by its slotted end, is then inserted through collar 41 and leg bore 37C of corresponding axial support plate 37. Referring to FIGS. 3A, 6 and 8A, radial displacement slot 53A of each triangular bracket arm 53 is aligned in slot 60A of corresponding front leg 60, and a connecting pin 59 is inserted through connecting pin hole 60B of front leg 60 and through radial displacement slot 53A. Connecting pin 59 is loosely secured by a nut (not shown).

FIGS. 3A and 3B show front segment 20 disposed within a pipe 65 having a pipe wall 67 and an inside surface 67A thereof. FIG. 3A shows front segment 20 in a retracted or released position, and FIG. 3B shows front segment 20 in a extended or holding position. It can be seen that the mechanical linkage just described acts to translate the forces carried by the reciprocating axial motion of elongate member 49, as multiplied and transferred by front linear actuator 45, to forces carried by the reciprocating radial motion of front legs 60. Owing to the design of central bracket 55, the axial displacement of central bracket 55 causes all front legs 60 and pressure pads 64 to extend and retract in unison. This is evident in FIG. 9, which illustrates the preferred relative positions of central bracket 55 and axial support plates 37 from a point of view directed toward an inside surface 33A of second radial support plate 33. Slot 37E of each axial support plate 37 provides clearance for corresponding triangular bracket arm 53 as bracket arm 53 moves.

In order to efficaciously transmit power from front linear actuator 45 to pressure pads 64, front linear actuator 45 can be provided as either a single-action or double-action type. For a single-action type, front linear actuator 45 utilizes air pressure to apply force in one direction and a spring-return mechanism provided with front linear actuator 45 utilizes stored mechanical energy to apply force in the opposite direction. For a double-action type, front linear actuator 45 utilizes air pressure to apply force in both directions.

When a single-action linear actuator is employed in the present invention, it is further preferred that front linear actuator 45 be provided as a reverse-action type. Accordingly, when air pressure is applied, front linear actuator 45 pulls its elongate member 49 inwardly, and when air pressure is removed the spring-return mechanism pushes elongate member 49 back outwardly. Thus, FIG. 3A illustrates front segment 20 in its retracted position wherein no air pressure is being applied. In the retracted position, elongate member 49 and central bracket 55 are in their foremost axial positions and each triangular bracket arm 53 is rotated about the pivot point of its associated radial bracket 39. As a result, front legs 60 are retracted radially inwardly and pressure pads 64 do not contact inside surface 67A of pipe wall 67. When in the retracted position, front segment 20 is free to crawl forwardly or backwardly in response to the locomotive action of medial segment 70, as described in more detail hereinbelow.

FIG. 3B illustrates front segment 20 in its extended position wherein air pressure is applied. In the extended position, elongate member 49 and central bracket 55 have been pulled to their rearmost axial positions, and each triangular bracket arm 53 has rotated about its pivot point such that front legs 60 have extended radially outwardly and pressure pads 64 make forcible, frictional contact with inside surface 67A of pipe wall 67. When in the extended position, front segment 20 is leveraged against pipe wall 67 and consequently cannot move in response to the work done by medial segment 70.

In one working embodiment of the present invention, the mechanical linkages are characterized by a 2:1 length ratio that halves the force applied by front linear actuator 20 while doubling the distance or stroke of front linear actuator 20. The force developed by the cylinder of front linear actuator 20 is a function of the air pressure and the power factor of the cylinder. The power factor is proportional to the area of the piston inside the cylinder. For the BIMBA cylinder employed in the preferred embodiment, this power factor has a value of 0.9. Thus, when front linear actuator 20 is provided in the form of a pneumatic cylinder, the contacting force imparted by pressure pads 64 on pipe wall 67 can be quickly estimated according to the following equation:

$$F = P = (0.9) \times (\frac{1}{2}) \times (\frac{1}{4})$$

This equation takes into account the power factor, the 2:1 length ratio, and the fact that the force is distributed to four pressure pads 64. For example, if a pressure of 80 psi is supplied to the cylinder, a force of 9 lbs. is developed in each pressure pad 64. It will be understood that this force calculation neglects any losses due to friction, binding, and related factors. Nevertheless, the above-calculated magnitude of force was empirically determined to be more than sufficient to hold the overall weight of robot 10 in place, even in the worst case condition where robot 10 is crawling upwardly in a vertical section of pipe 65. In one test, robot 10 having a overall weight of approximately 4 lbs. was observed to be able to maintain a vertical position within pipe 65 even with a 10-lb. weight attached to robot 10.

Referring back to FIG. 2, medial framework 75 of medial segment 70, includes first, second, third and fourth radial support plates 81, 83, 85 and 87, respectively. As in the case of radial support plates 31, 33 and 35 of front framework 25, each radial support plate 81, 83, 85 and 87 of medial framework 75 has four equally spaced pairs of through-holes 31A in accordance with the pattern shown in FIG. 4. First, second, third and fourth radial support plates 81, 83, 85 and 87 are axially spaced from each other by four pairs of axial support rods 89, of which only four are shown in FIG. 2. To secure medial framework 75, each end of each axial support rod 89 is threaded in order to receive nuts (not shown) at one or both sides of first and fourth radial support plates 81 and 87. First and second radial support plates 81 and 83 are axially spaced from each other by first medial linear actuator 95A, and third and fourth radial support plates 85 and 87 are axially spaced from each other by second medial linear actuator 95B.

First and second medial linear actuators 95A and 95B each include respective, oppositely oriented, axially movable elongate members 99A and 99B. Elongate members 99A and 99B respectively extend through central hole 31B of first and fourth radial support plates 81 and 87 (see FIG. 4). First and second medial linear actuators 95A and 95B are preferably single-action or double-action pneumatic cylinders as in the case of front linear actuator 45, but alternative work-energy transfer devices could be provided as indicated hereinabove. Compressed air is preferably supplied to both first and second medial linear actuators 95A and 95B over a common air line 97 which branches off to respective fittings 97A and 97B. If single-action cylinders are employed, it is preferable that first and second medial linear actuators 95A and 95B both be provided as normal-action devices. That is, when air pressure is applied, first medial linear actuator 95A pushes elongate member 99A outwardly and second medial linear actuator 95B pushes elongate member 99B outwardly. When air pressure is removed, a spring-return mechanism provided with first medial linear actuator 95A pulls elongate member 99A inwardly and a spring-return mechanism provided with second medial linear actuator 95B pulls elongate member 99B inwardly.

The design and operation of rear segment 120 and its associated components are essentially the same as that of front segment 20, and thus can be described by referring to FIGS. 2–9. Rear framework 125 includes first, second and third radial support plates 131, 133, and 135, respectfully, each having the general configuration shown in FIG. 4. First and second radial support plates 131 and 133 are axially spaced from each other by four axial support plates 137, of which only one is shown in FIG. 2. Each axial support plate 137 is similar in design to axial support plates 37 of front segment 20, and accordingly has the general configuration and attributes shown in FIGS. 5A–5C. Each axial support plate 137 thus includes a radial bracket 139 and a collar 141 serving as a guide for its corresponding rear leg 160. Second and third radial support plates 133 and 135 are axially spaced from each other by rear linear actuator 145, which preferably is a reverse-action pneumatic cylinder driving an elongate member 149 as described hereinabove in the case of front linear actuator 45. Compressed air is supplied to rear linear actuator 145 over an air line 147 connected to a fitting 147A.

The rear mechanical linkage for rear segment 120 is constructed in the same manner as regards the front segment 20, utilizing a triangular bracket arm 153 and a central bracket 155. The rear mechanical linkage provides an interface between rear linear actuator 145 and four rear legs 160 in the manner shown and described with reference to FIGS. 3A and 3B and the front mechanical linkage.

Referring back to FIG. 2, front and medial segments 20 and 70 are connected by first flexible coupling 172 and medial and rear segments 70 and 120 are connected by second flexible coupling 174. To enable robot 10 to navigate 90° turns, each flexible coupling 172 and 174 is preferably constructed of a length of heavy-duty plastic tubing. First flexible coupling 172 is anchored to front segment 20 by inserting one end of first flexible coupling 172 onto an aluminum hex standoff 20A mounted to front segment 20 such as at third radial support plate 35 of front framework 25, and by securing a clamp (not shown) around the outer surface of that end. First flexible coupling 172 is anchored to medial segment 70 by inserting the other end of first flexible coupling 172 onto the head of a bolt 70A extending from elongate member 99A, and by securing a clamp (not shown) around the outer surface of that end. Similarly, second flexible coupling 174 is anchored to rear segment 120 by inserting one end of second flexible coupling 174 onto an aluminum hex standoff 120A mounted to rear segment 120 such as at first radial support plate 131 of rear framework 125, and by securing a clamp (not shown) around the outer surface of that end. Second flexible coupling 174 is anchored to medial segment 70 by inserting the other end of second flexible coupling 174 onto the head of a bolt 70B extending from elongate member 99B, and by securing a clamp (not shown) around the outer surface of that end.

Figure 10A:
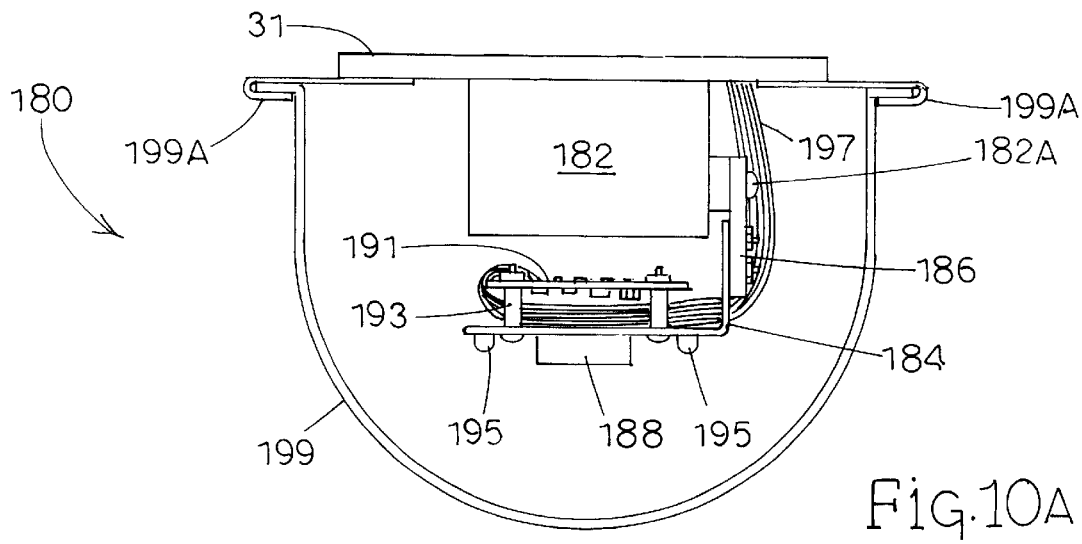
FIGS. 10A, 10B and 10C are top plan views of a nose module of the robotic apparatus of FIG. 1 illustrating different positions of a sensing device included thereon.
Figure 10B:
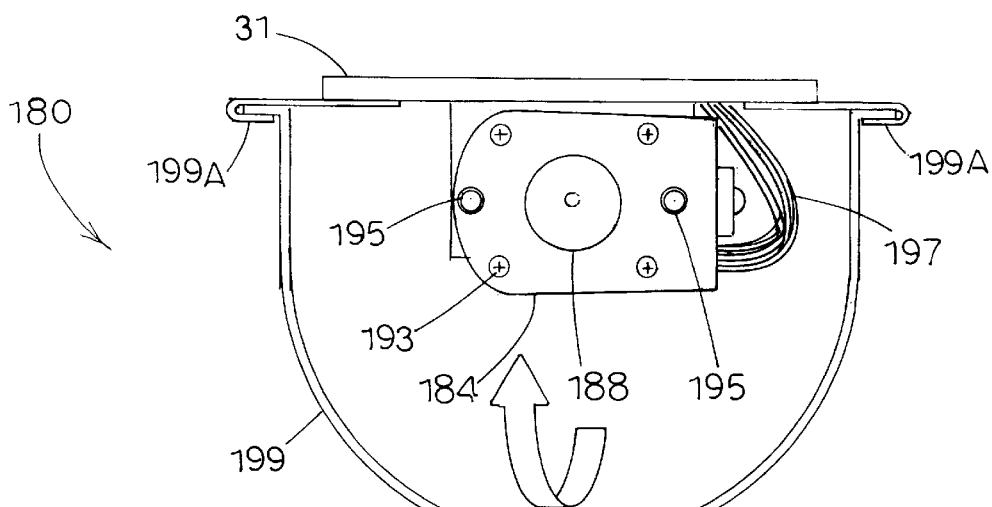
Figure 10C:
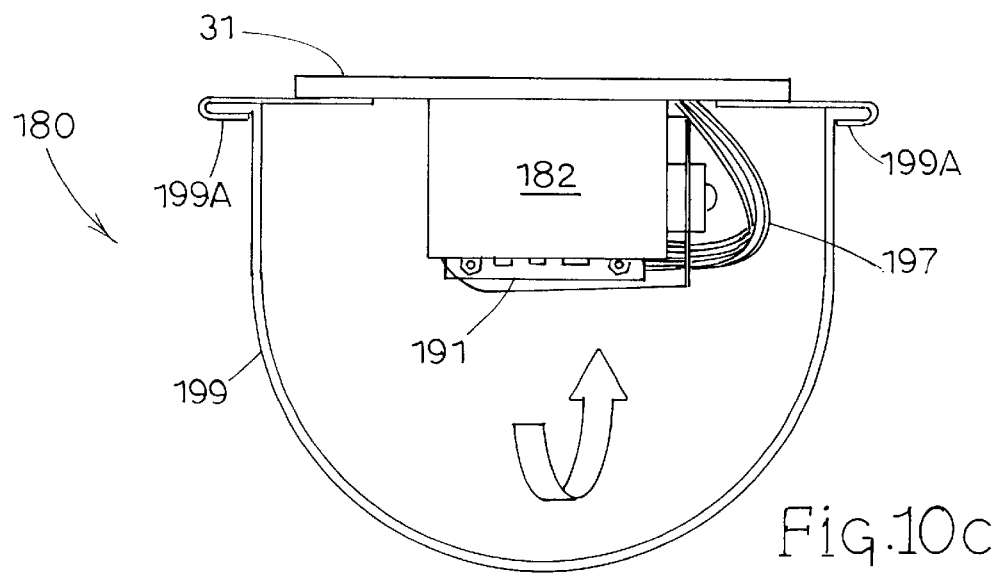

Referring to FIGS. 10A–10C, the details of nose module 180 will now be described. Nose module 180 is built off of first radial support plate 31 of front segment 20, although it will be understood that nose module 180 could be provided with a separate base plate appropriately mounted in spatial relation to first radial support plate 31. Nose module 180 includes a servo motor 182 attached to a lightweight aluminum camera mounting bracket 184 through a suitable linkage 186. A CCD color video camera 188 is mounted to mounting bracket 184. As shown in the sequence of FIGS. 10A, 10B and 10C, servo motor 182 is employed to swivel video camera 188 180° about a rotational axis 182A of servo motor 182.

A video circuit board 191 configured to control and process signals from video camera 188 is mounted to mounting bracket 184 and spaced therefrom by one or more posts 193. Two white LEDs 195 are mounted to mounting bracket 184 to provide light for video camera 188. Each LED 195 outputs approximately 2000 mcd, and consumes approximately 35 mA at a forward voltage drop of 3.5V. LEDs 195 are wired in parallel, with a single 22Ω series resistor (not shown) provided to limit the current fed to LEDs 195. A wire bundle 197 from circuit board 191 includes a coax conductor and coax shield for the video signal, as well as DC voltage lines to provide power to video camera 188. Appropriate servo power and control lines (not shown) are grouped with wire bundle 197 which then runs along the length of robot 10. Finally, in order to protect video camera 188 and ensure smooth locomotion of robot 10, nose module 180 further includes a transparent polymeric dome or shell 199 secured to mounting clips 199A, which mounting clips 199A are in turn attached to first radial support plate 31.

It will be understood that robot 10 could be provided with additional sensors and instruments such as those delineated hereinabove. One or more of these additional sensors and instruments could be mounted off of nose module 180 or at various other locations on robot 10 such as, for example, radial support plates 31, 33, 35, 81, 83, 85, 87, 131, 133 and 135.

Figure 11B:
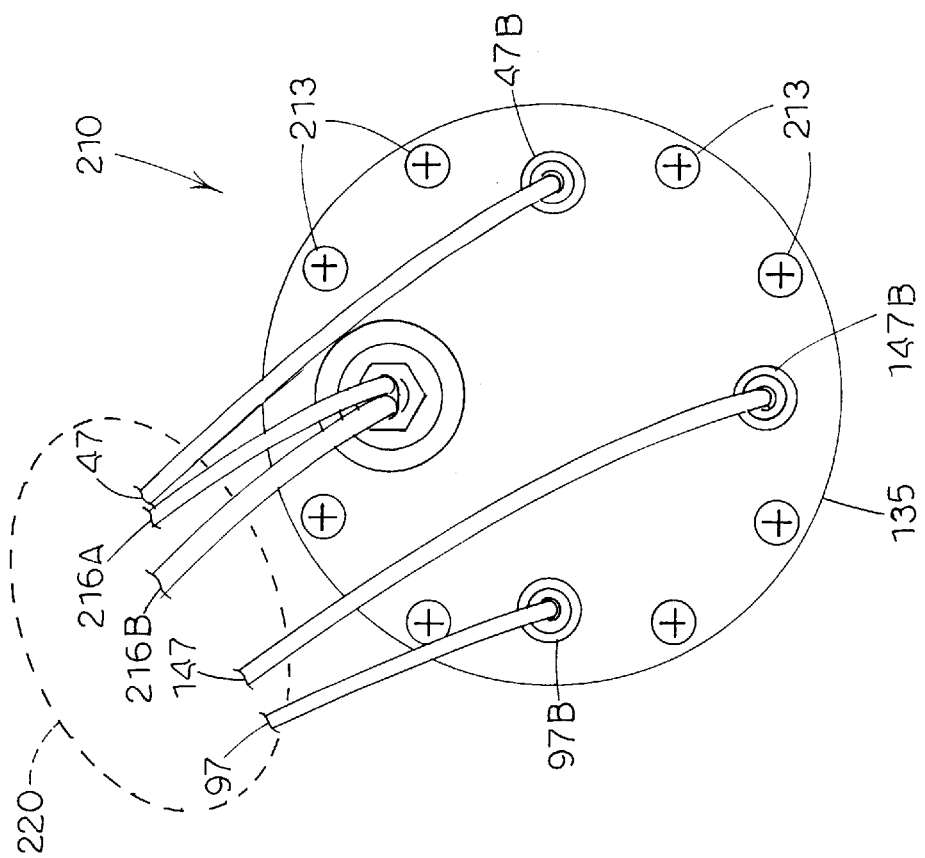
FIG. 11B is a rear elevation view of the tail section of FIG. 11A.
Figure 11A:
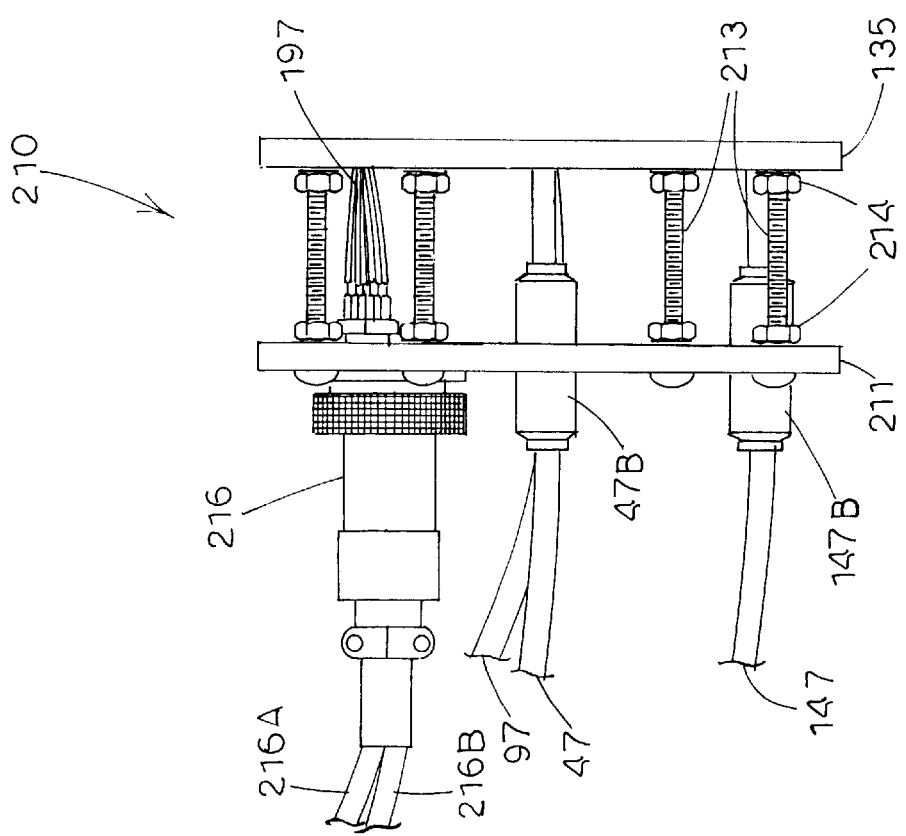
FIG. 11A is a side elevation view of a tail section of the robotic apparatus of FIG. 1 according to the present invention.

Referring to FIGS. 11A and 11B, rear segment 120 preferably includes an extended or tail section generally designated 210 in order to better accommodate the various pneumatic and electrical connections made to robot 10. Tail section 210 is structurally defined by third radial support plate 135 of rear segment 120 and a back plate 211 mounted in spaced relation to third radial support plate 135 by four pairs of threaded bolts 213 secured with several nuts 214. Back plate 211 includes respective pneumatic connectors 47B, 97B, and 147B for front, medial and rear air lines 47, 97 and 147. Wire bundle 197 from nose module 180 is connected to an electrical connector 216 on back plate 211, from which two cables 216A and 216B are outputted. All connectors 47B, 97B, 147B and 216 are preferably of the quick-release type in keeping with the modularity of robot 10. Collectively, cables 216A and 216B and air lines 47, 97 and 147 define a tether or umbilical cord 220 that travels with robot 10 during operations.

In the exemplary embodiment disclosed herein, robot 10 is adapted to crawl through 6-inch diameter pipes and can turn along a radius of curvature as little as approximately 12 inches. Some exemplary dimensions for this particular embodiment are given in the following Table.

TABLE

| | |
|---|---|
| air lines | 1/8 in. diameter nylon tubing |
| front and rear air cylinders | bore: 1 1/16 in.<br>stroke: 1/2 in. |
| medial air cylinders | bore: 3/4 in.<br>stroke: 1 in. |
| flexible couplings | 1/2 in. OD, 1/4 in. ID clear plastic tubing |
| hex standoffs | 3/4 in. long |
| radial support plates | 3 in. diameter, 1/8 in. thick |
| overall length of front segment from first to third radial support plate | 5.63 in. |
| axial support plates | 3.375 in. long, 1 in. wide, 1/4 in. thick |
| triangular bracket arms | 1/8 in. thick axial length between vertices prior to milling: 2 25/64 in. radial length between vertices prior to milling: 1 25/128 in. |
| central bracket | axial length: 15/16 in.<br>axial bore dia.: 9/64 in. |
| front and rear legs | 1 5/8 in. length, 1/4 in. dia. |
| medial frame | 5.865 in. overall length spacing between second and third radial support plates: 1.745 in. |

Referring to FIGS. 12A–12F, the crawling method accomplished by robot 10 along either a horizontal, inclined or vertical path will now be described. FIGS. 12A–12F illustrate the cyclical locomotive sequence utilized by robot 10 in order to crawl forwardly, although it will be understood that the reverse sequence can be utilized by robot 10 to crawl backwardly. As shown in FIG. 12A, robot 10 is placed in an enclosed space such as pipe 65. Initially, robot 10 assumes a released position in which all front and rear pressure pads 64 and 164 are retracted and medial segment 70 is contracted. As shown in FIG. 12B, rear pressure pads 164 are extended to forcibly grip inside surface 67A of pipe 65, thereby frictionally holding the position of rear segment 120 within pipe 65. Front pressure pads 64 remain retracted during this step. As shown in FIG. 12C, first and second medial linear actuators 95A and 95B are then activated to forcibly expand the overall length of medial segment 70, thereby pushing front and medial segments 20 and 70 forwardly. As shown in FIG. 12D, front pressure pads 64 are then extended to grip inside surface 67A of pipe 65, and rear pressure pads 164 are released. As shown in FIG. 12E, air pressure to first and second medial linear actuators 95A and 95B is removed to permit medial segment 70 to contract, thereby pulling rear and medial segments 120 and 70 forwardly. As shown in FIG. 12F, as long as the foregoing sequence is repeated, robot 10 will continue to crawl along any length of pipe 65 and around turns and inclines of up to 90°.

It can thus be seen that robot 10 is capable of effecting four basic modes of operation: FORWARD, REVERSE, HOLD, and RELEASE. The order of operation is dictated by the sequenced activation of linear actuators.

ROBOTIC SYSTEM AND HARDWARE DESIGN

Figure 13:
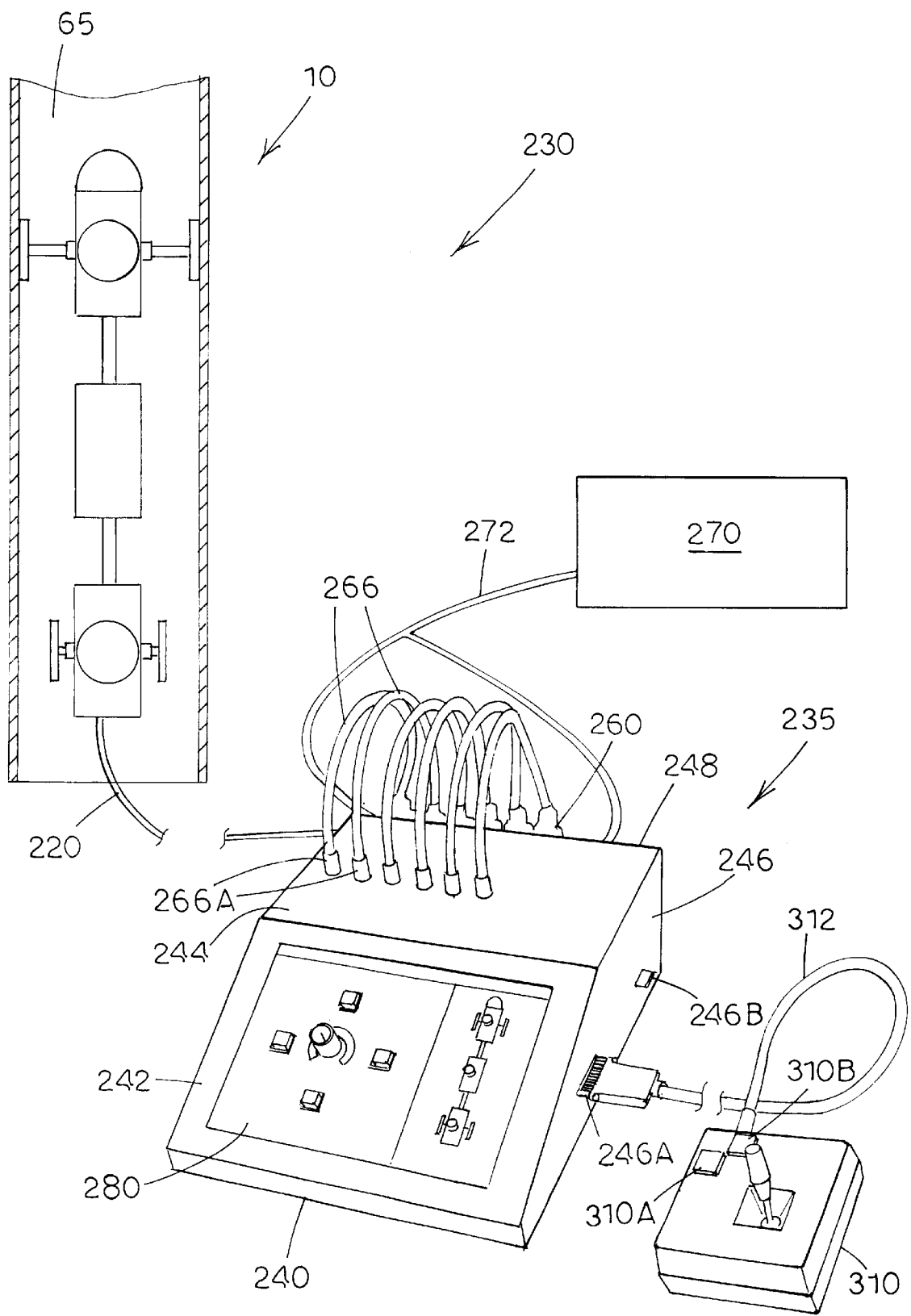
FIG. 13 is a perspective view of a robotic system provided in accordance with the present invention for controlling the movements and operation of the robotic apparatus of FIG. 1 within a pipe.

Referring to FIG. 13, a robotic system generally designated 230 is illustrated in accordance with the present invention. Robotic system 230 generally includes robot 10 operating within pipe 65, a control module or console generally designated 235, a joystick 310, and a locomotive power source such as an air compressor 270. Robot 10 communicates with control module 235 over aforedescribed tether 220 whose length can be selected according to the anticipated task to be performed by robot 10. Tether 220 includes all energy supply lines such as air lines 47, 97 and 147 to supply power to linear actuators 45, 95A and 95B, and 145, respectively, and electrical cables 216A and 216B to transfer appropriate operating voltages and control signals to servo motor 182 and video camera 188 in nose module 180, and to receive the video signal generated by video camera 188. Air compressor 270 supplies air to control module 235 over an air supply line 272. Joystick 310 communicates with control module 235 over a joystick cable 312.

Referring to FIGS. 13–16, the details of control module 235 are shown. Control module 235 functions to control linear actuators 45, 95A, 95B and 145 in the basic modes of operation of robot 10 (FORWARD, REVERSE, HOLD, and RELEASE), and to control servo motor 182 based on manipulation of joystick 310. Control module 235 generally includes a housing 240, a power supply (not shown), a solenoid module 260, a microcontroller U, and a control panel 280.

Figure 14:
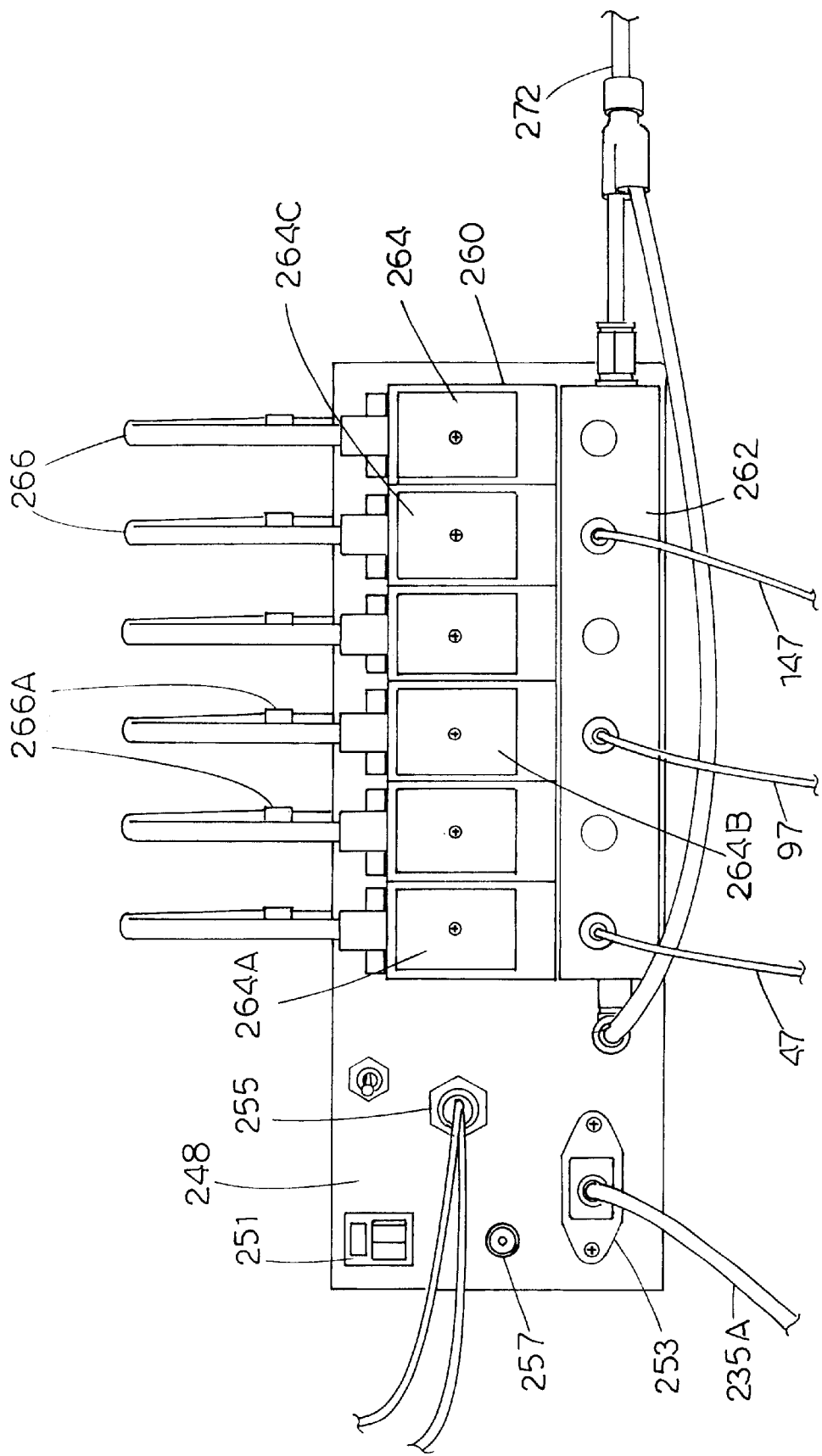
FIG. 14 is a rear elevation view of a control module provided in accordance with the present invention.

Referring to FIG. 13, housing 240 includes a front panel 242, a top panel 244, a side panel 246 and a back panel 248, and encloses the power supply, microcontroller U and control panel 280. Side panel 246 includes a DB-15 joystick port 246A for establishing communication with joystick 310 over joystick cable 312, and a DB-9 PC serial port 246B for downloading software code to microcontroller U from a PC-compatible computer (not shown). Referring to FIG. 14, back panel 248 includes a lighted rocker-type power switch 251 for switching power to control module 235, a power cord socket 253 for receiving a power cord 235A, a jack 255 for connecting cables 216A and 216B, and a video output port 257 for sending signals from video camera 188 to a monitor or recording device over an RCA cable (not shown). The power supply has a single output operating at 5V and 10A, and provides operating power to microcontroller U, solenoid module 260, video camera 188, and servo motor 182.

Solenoid module 260 includes a solenoid manifold 262 communicating with a bank of solenoids 264 and associated valves mounted on solenoid manifold 262. Solenoid module 260 is connected to receive an input stream of compressed air from air compressor 270 and to direct the air to solenoids 264. Each solenoid 264 controls the flow of air to its associated linear actuator 45, 95A and 95B, or 145 over one of air lines 47, 97 or 147. Each solenoid 264 operates at a current of approximately 750 mA provided from control module 235 over solenoid signal lines 266 plugged into connectors 266A located on top panel 244 of control module 235. In the preferred embodiment, the bank of solenoids 264 includes at least three solenoids 264A, 264B and 264C operative to control front, first and second medial, and rear linear actuators 45, 95A and 95B, and 145, respectively. Additional solenoids 264, however, can be included for controlling auxiliary equipment carried by robot 10. Solenoid module 260 is removably attached to back panel 248 of control module 235 using fasteners such as mating VELCRO-type strips (not shown). Solenoid module 260 is disposed external to control module 235 because the compressed air must be vented to the atmosphere.

It will be understood that the mobility of robotic system 230 can be enhanced, for example, by providing the power supply in the form of one or more battery units and by providing the locomotive power source in the form of a user-wearable pressurized tank.

Figure 15:
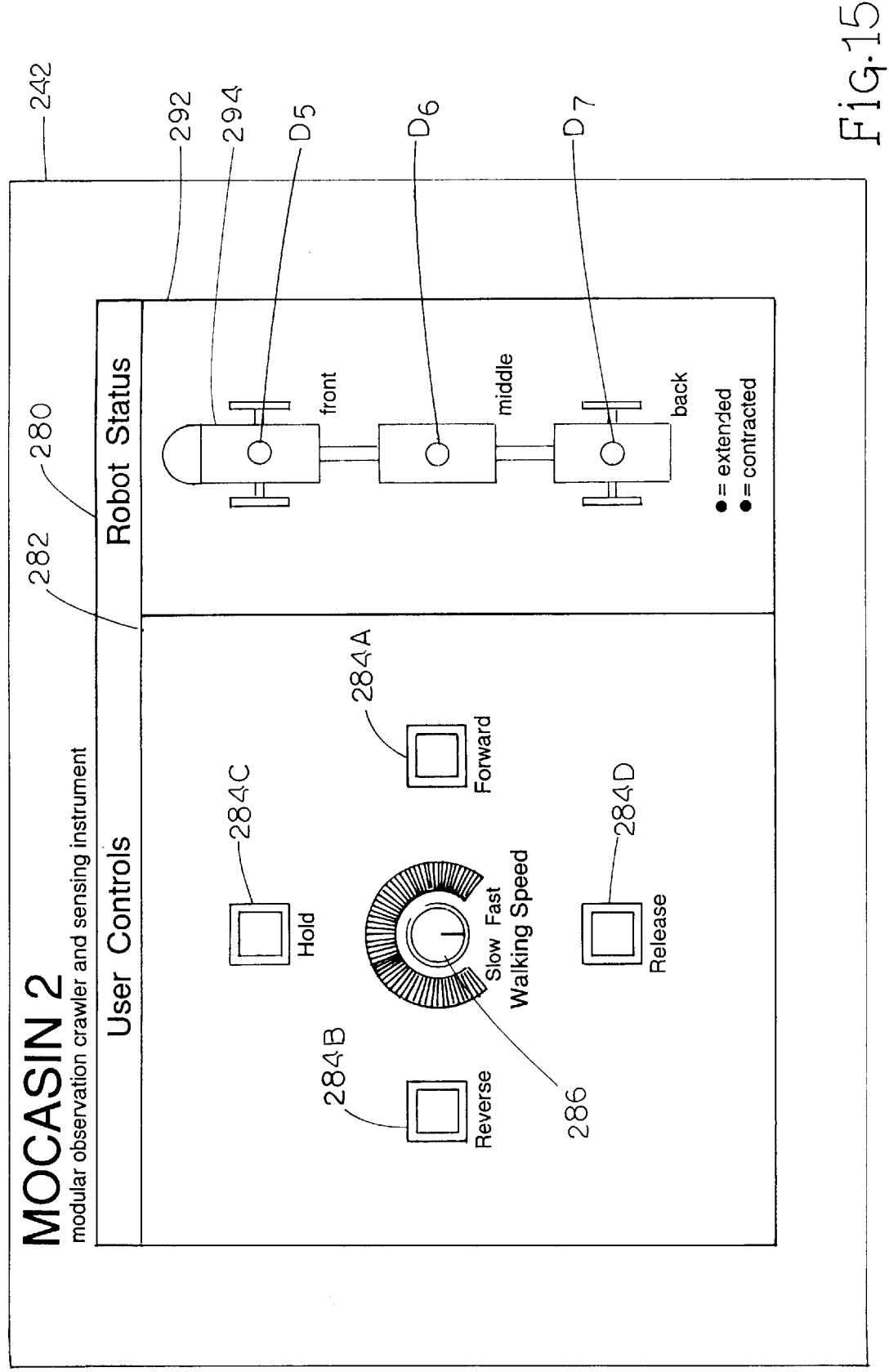
FIG. 15 is a front elevation view of a control panel provided in accordance with the present invention.

Referring to FIG. 15, control panel 280 forms a part of front panel 242 of housing 240, and is divided into a user control area 282 and a robot status area 292. User control area 282 includes a FORWARD button 284A, a REVERSE button 284B, a HOLD button 284C and a RELEASE button 284D, thus permitting the user to control the basic modes of operation of robot 10 from control module 235. Each mode button 284A–D is lighted by a corresponding light-emitting diode (LED) $D_1$–$D_4$ (see FIG. 16) when switched to its ON state. User control area 282 also includes a rotatable speed dial or knob 286 operatively connected to a speed potentiometer $POT_2$ (see FIG. 16) for controlling the crawling speed of robot 10. Robot status area 292 includes a diagram 294 of robot 10 depicting front, medial and rear segments 20, 70 and 120 with associated status LEDs. Diagram 294 thus contains a front LED $D_5$, a medial LED $D_6$, and a rear LED $D_7$, corresponding to front, medial and rear segments 20, 70 and 120 to indicate the extensions and retractions of linear actuators 45, 95A and 95B, and 145 during movement of robot 10 through pipe 65. Front, medial and rear LEDs $D_5$, $D_6$ and $D_7$ are preferably of the dual-colored type. Each LED $D_5$, $D_6$ and $D_7$ can, for example, emit a red light when its linear actuator(s) 45, 95A and 95B, or 145 is extended and a green light when its linear actuator(s) 45, 95A and 95B, or 145 is retracted.

Figure 16:
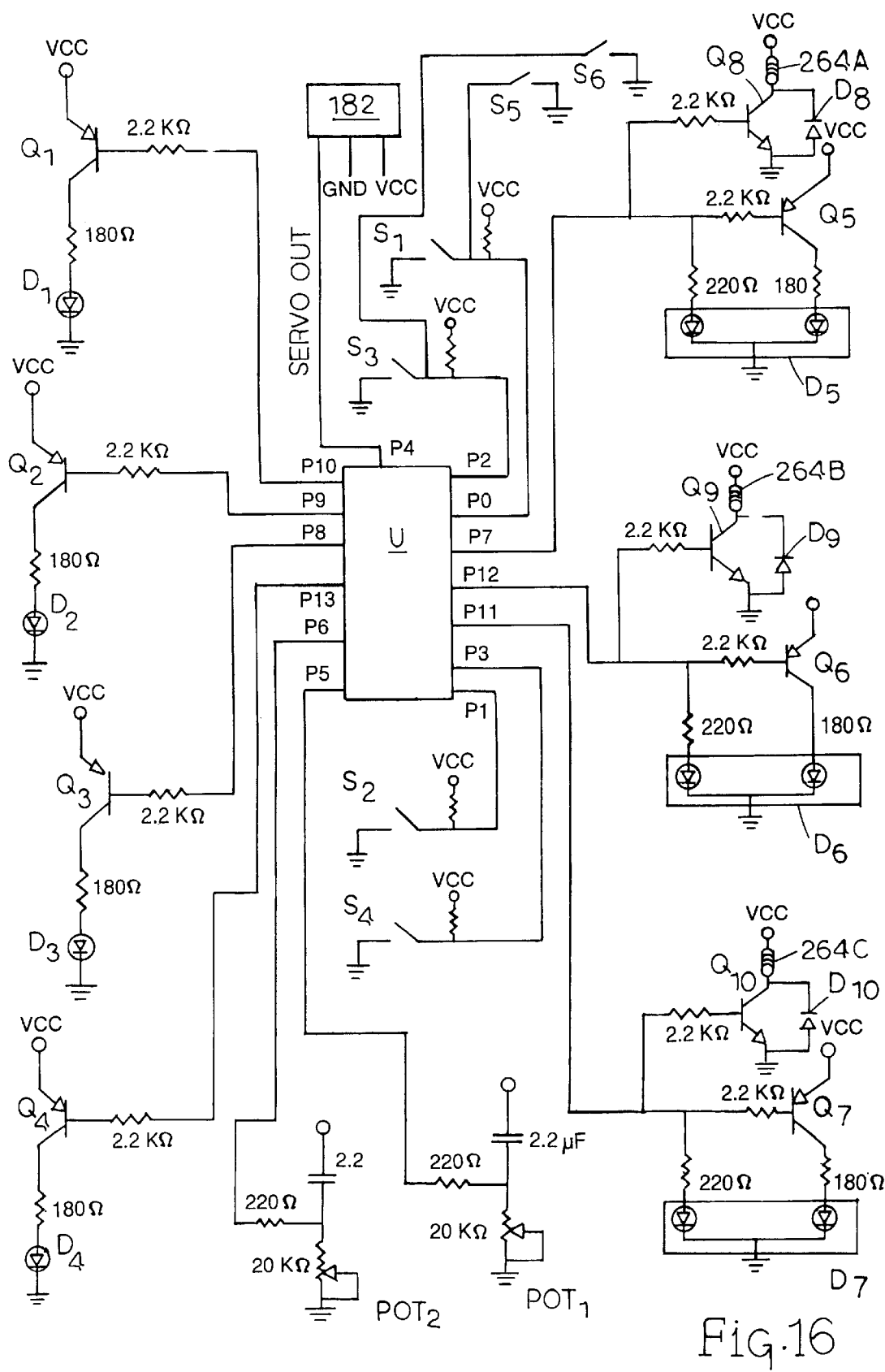
FIG. 16 is a schematic view of electronic circuitry provided in accordance with the present invention.

Referring to FIG. 16, a schematic diagram of the exemplary electronic circuitry for control module 235 is illustrated. The heart of the circuitry is microcontroller U, which can be any suitable microprocessor-based module.

Preferably, microcontroller U is a BASIC Stamp II (with the processor designated PIC16C57) or BASIC Stamp IISX (with the processor designated SX28AC) integrated-circuit chip available from PARALLAX, INC. BASIC Stamp microcontroller U is essentially a small computer capable of executing programs written in PARALLAX BASIC (PBASIC) high-level language. For this purpose, a non-volatile serial EEPROM (2 Kbytes or 16 Kbytes), a 5V regulator, a 20 Mhz or 50 Mhz resonator, and a PBASIC interpreter chip are mounted on the IC chip of microcontroller U. Microcontroller U holds 500 to 600 instructions and executes an average of 4000 (in the case of a 20 Mhz resonator) or 10,000 (in the case of a 50 Mhz resonator) instructions per second.

The IC chip of microcontroller U has sixteen fully programmable input/output pins, I/O pins P0–P15 shown in FIG. 16, that can be used to directly interface with TTL-level (transistor-transistor logic) devices such as buttons, LEDs, speakers, potentiometers and shift registers. By providing suitable additional components known to those skilled in the art, I/O pins P0–P15 P15 can be connected to non-TTL devices such as solenoids, relays, RS-232 networks and other high-current devices. The IC chip also has other conventional pins not shown in FIG. 16, such as PWR ($V_{IN}$) and GND ($V_{SS}$) pins for inputting operating voltage, a reset (RES) pin, and a +5V ($V_{DD}$) pin for outputting a 5V voltage. Also included but not shown are four pins for communicating with PC serial port 246B. These serial pins include two synchronous pins $S_{OUT}$ and $S_{IN}$ for connecting to the receive-data (RX) and transmit-data (TX) pins of PC serial port 246B, respectively, an attention (ATN) pin for connecting to the data-terminal-ready (DTR) pin of PC serial port 246B, and a GND ($V_{SS}$) pin for connecting to the signal ground (GND) pin of PC serial port 246B. At PC serial port 246B, the data-set-ready (DSR) and request-to-send (RTS) pins can be interconnected for automatic port detection. The various serial connections enabling data transfer at PC serial port 246B are understood by those skilled in the art.

The I/O pin connections for microcontroller U are as follows. Pin P0 is connected to a switch $S_1$ associated with FORWARD button 284A on control panel 280, and to a switch $S_5$ associated with FORWARD button 310A on joystick 310. Pin P1 is connected to a switch $S_2$ associated with REVERSE button 284B on control panel 280. Pin P2 is connected to a switch $S_3$ associated with HOLD button 284C on control panel 280, and to a switch $S_6$ associated with HOLD button 310B on joystick 310. Pin P3 is connected to a switch $S_4$ associated with RELEASE button 284D on control panel 280. Pin P4 is connected to a SERVO OUT line to servo motor 182. Pin P5 is connected to a potentiometer $POT_1$ in joystick 310. Pin P6 is connected to speed potentiometer $POT_2$ associated with speed dial 286 on control panel 280. Pin P7 is connected to a front solenoid driver circuit and a front LED driver circuit. The front solenoid driver circuit includes front solenoid 264A, a power transistor $Q_8$ for switching front solenoid 264A between ON and OFF states, and a snubber diode $D_8$ to control the transients of power transistor $Q_8$. The front LED driver circuit includes front dual-colored LED $D_5$ and a driver transistor $Q_5$ for driving front LED $D_5$.

Pin P8 is connected to a driver transistor $Q_3$ associated with LED $D_3$ of HOLD button 284C. Pin P9 is connected to a driver transistor $Q_2$ associated with LED $D_2$ of REVERSE button 284B. Pin P10 is connected to a driver transistor $Q_1$ associated with LED $D_1$ of FORWARD button 284A. Pin P11 is connected a rear solenoid driver circuit and a rear LED driver circuit. The rear solenoid driver circuit includes rear solenoid 264C, a power transistor $Q_{10}$, and a snubber diode $D_{10}$. The rear LED driver circuit includes rear LED $D_7$ and a driver transistor $Q_7$. Pin P12 is connected a medial solenoid driver circuit and a medial LED driver circuit. The medial solenoid driver circuit includes medial solenoid 264B, a power transistor $Q_9$, and a snubber diode $D_9$. The medial LED driver circuit includes medial LED $D_6$ and a driver transistor $Q_6$. Pin P13 is connected to a driver transistor $Q_4$ associated with LED $D_4$ of RELEASE button 284D. P14 (not shown) is not used in the present embodiment. P15 (not shown) is used as a dummy output.

As understood by those skilled in the art, the circuitry for control module 235 also includes various passive devices such as resistors serving pull-up and current-limiting functions as well as timing capacitors. Finally, it should be noted that two circuit boards (not shown) connected by a 16-line ribbon cable could be utilized to simplify assembly of control module 235. The first circuit board would be a main board on which microcontroller U and the solenoid driving components are mounted. The second circuit board would be a front panel board mounted directly underneath control panel 280 and on which are mounted mode buttons 284A–D, LEDs $D_{1-D7}$, and speed potentiometer $POT_2$ and associated circuit components.

In operation, output pressure from air compressor 270 should be regulated between approximately 60 and 90 psi. Mode buttons 284A–D on control panel 280 are used to control the locomotive operations of robot 10. FORWARD button 284A and REVERSE button 284B initiate the actuating sequences necessary to cause robot 10 to crawl forward and backward, respectively. HOLD button 284C is used to maintain robot 10 in a stationary position within pipe 65. In the HOLD state, all front and rear legs 60 and 160 of robot 10 are extended to grip pipe 65 and medial segment 70 is in either its expanded or contracted position, depending on the state of medial segment 70 prior to initialization of the HOLD state. RELEASE button 284D is used to cause to robot 10 to retract all front and rear legs 60 and 160 as well as to contract medial segment 70 (i.e. to retract elongate members 99A and 99B of both first and second medial linear actuators 95A and 95B).

When control module 235 is first powered up, the released position is the default state and LED $D_4$ will light up RELEASE button 284D to so indicate. This default state permits robot 10 to be easily loaded into pipe 65. The horizontal axis of joystick 310 is used to control the motion of video camera 188 along its axis about rotational axis 182A of servo motor 182. Joystick 310 can also include buttons to control one or more of the operating modes of robot 10. Thus, in FIG. 13, joystick 310 includes respective FORWARD and RELEASE buttons 310A and 310B. Although not shown for the present embodiment, joystick 310 could also include REVERSE and HOLD buttons.

SOFTWARE DESIGN FOR MICROCONTROLLER

The software code loaded into microcontroller U controls the appropriate sequencing of linear actuators 45, 95A and 95B, and 145, the speed at which the sequencing progresses according to the analog input from speed potentiometer $POT_2$, and the positioning of servo motor 182 according to the analog input from joystick 310. A tokenized PBASIC program is stored in the EEPROM of microcontroller U and is read from and written to by the interpreter chip. The interpreter chip fetches the instructions one at a time and performs the appropriate operation on I/O pins P0–P15 or internal structures within the interpreter chip. Because the PBASIC program is stored in an EEPROM, it can be programmed and reprogrammed almost endlessly, without the need to first erase the memory as in the case of many other types of microcontrollers. Microcontroller U can be programmed by connecting to a PC-compatible computer through serial port 246B and running either DOS or WINDOWS editor software. The editor can be used to download the program, check program syntax, display the available memory resources of microcontroller U, and debug the program. The programmer can insert DEBUG commands into the program to allow the viewing of variable values on the PC monitor.

In the present embodiment, the design of the software code takes into account that servo motor 182 must periodically receive a pulse whose width determines the angular position to which servo motor 182 should attempt to move. It was found that the closer together these pulses occur, the smoother servo motor 182 runs. In order to accommodate this requirement, the software code has an inner loop and an outer loop. Microcontroller U remains in the inner loop for a certain number of iterations, checking its inputs each time. The number of iterations is determined by the variable 'SPEED' (see instruction set below), which is set based on the position of speed dial 286 on control panel 280. The code pauses for a constant amount of time every time the inner loop executes, and this pause is set by the constant 'INDELAY' (see instruction set below). When the inner loop has executed the predetermined number of iterations, the code then executes the outer loop once. The function of the outer loop is to advance to the next state of whichever mode sequence is currently active, unless a mode button 284A–D or 310A–B was pressed in which case the current mode is changed. After setting the correct outputs for the current state, the code then goes back into the inner loop and the process repeats.

An exemplary set of PBASIC instructions for BASIC Stamp microcontroller U can be provided according to the following software listing:

```
'   PINS
'   P0      Forward Button
'   P1      Reverse Button
'   P2      Hold Button
'   P3      Release Button
'   P4      Servo Out
'   P5      Joystick
'   P6      Speed Pot
'   P7      Front LED and Driver Output
'   P8      Hold LED
'   P9      Reverse LED
```

-continued

```
'   P10            Forward LED
'   P11            Back LED and Driver Output
'   P12            Middle LED and Driver Output
'   P13            Release LED
'   P14            Unused
'   P15            Unused - used as dummy output
' values that 'currstate' can take on
FORWARD         con    0
REVS            con    1
HOL             con    2
RELEASE         con    3
' pin definition constants
SPEEDPOTIN      con    6          'Input: Speed pot
JOYSTICKPIN     con    5          'Input: Servo position joystick
SERVOUTPIN      con    4          'Output: Servo pulses
FRONTPIN        con    7          'OUTPUT PIN FOR FRONT LEGS
MIDPIN          con    12         'OUTPUT PIN FOR MIDDLE
BACKPIN         con    11         'OUTPIN FOR BACK LEGS
BUTFWD          con    0          'FORWARD BUTTON (Green)
BUTREV          con    1          'REVERSE BUTTON (Green)
BUTREL          con    3          'RELEASE BUTTON (Red)
BUTHOLD         con    2          'HOLD BUTTON (Red)
DUMMYPIN        con    15         'Used for fine timing
INDELAY         con    5          'delay for inner loop
POTMAX          con    2000       'maximum value that speed pot
                                   reads
SPEEDMIN        con    30         'minimum value for 'speed' variable
                                   (was '10')
SPEEDMAX        con    100        'maximum value for 'speed' variable
JOYMAX          con    11200      'maximum value that joystick reads
PULSEMIN        con    350        'minimum value for 'pulsewidth'
                                   variable (min 350)
PULSEMAX        con    1100       'maximum value for 'pulsewidth'
                                   variable (max 1150)
' declares variables
CURRSTATE       var    nib
CURRSEQ         var    nib
SEQ             var    nib(6)
HOLDSEQ         var    nib(6)
CURRSTEP        var    nib        'variable to tell which step of the seq in
BTNWK           var    byte       'button workspace
I               var    byte       'counter
POTVAL          var    word       'direct reading of pot value
POTCONST        var    word
JOYVAL          var    word       'direct reading of joystick value
JOYCONST        var    word
SPEED           var    word       'stepping speed (in ~50 ms units)
PULSEWIDTH      var    word       'servo pulse width (in ~2 us units)
' start program
INITIAL
POTCONST = POTMAX/(SPEEDMAX-SPEEDMIN)
JOYCONST = JOYMAX/(PULSEMAX-PULSEMIN)
DIR4 = 1          'servo out
DIR7 = 1          'front out
DIR11 = 1         'rear out
DIR12 = 1         'mid out
DIR8 = 1          'hold old
DIR9 = 1          'reverse out
DIR10 - 1         'forward out
DIR13 = 1         'release out
OUT8 = 1          'initialize hold LED
OUT9 = 1          'initialize reverse LED
OUT10 = 1         'initialize forward LED
OUT13 = 0         'initialize release LED
SEQ(0) = %101     'Forward walking sequence (Front, Middle, Back)
SEQ(1) = %001
SEQ(2) = %011
SEQ(3) = %111
SEQ(4) = %110
SEQ(5) = %100
HOLDSEQ(0) = %101
HOLDSEQ(1) = %101
HOLDSEQ(2) = %111
HOLDSEQ(3) = %111
HOLDSEQ(4) = %111
HOLDSEQ(5) - %101
BTNWK - 0
SPEED - 20
CURRSTEP = 0
```

-continued

```
CURRSEQ = %000
CURRSTATE = RELEASE
I = 0
OUTLOOP
    I = I + 1
    PAUSE INDELAY
    GOSUB SPEEDCHECK
    GOSUB SERVOCHECK
    GOSUB SERVOPULSE
    BUTTON BUTFWD, 0, 255, 0, BTNWK, 1, FWDPRESS
    BUTTON BUTREV, 0, 255, 0, BTNWK, 1, REVPRESS
    BUTTON BUTREL, 0, 255, 0, BTNWK, 1, RELPRESS
    BUTTON BUTHOLD, 0, 255, 0, BTNWK, 1, HOLDPRESS
    GOTO CHECKINNER
FORWARD
    CURRSTATE = FORWARD
    OUT10 = 0   'Forward Status Pin
    OUT9 = 1    'Reverse Status Pin
    OUT8 = 1    'Hold Status Pin
    OUT13 = 1   'Release Status Pin
    GOTO CHECKINNER
RELPRESS
    CURRSTATE = RELEASE
    OUT10 = 1   'Forward Status Pin
    OUT9 = 1    'Reverse Status Pin
    OUT8 = 1    'Hold Status Pin
    OUT13 = 0   'Release Status Pin
HOLDPRESS
    CURRSTATE = HOLD
    OUT10 = 1   'Forward Status Pin
    OUT9 = 1    'Reverse Status Pin
    OUT8 = 0    'Hold Status Pin
    OUT13 = 1   'Release Status Pin
    GOTO CHECKINNER
CHECKINNER
    IF I < SPEED THEN OUTLOOP
    I = 0
    IF CURRSTATE = FORWARD THEN FWDNEXT
    IF CURRSTATE = REVS THEN REVNEXT
    IF CURRSTATE = HOLD THEN HOLDNEXT
    IF CURRSTATE = RELEASE THEN RELNEXT
    DEBUG "error - shouldn't be here!"
    GOTO OUTLOOP
FWDNEXT
    CURRSTEP = (CURRSTEP + 1)//6
    CURRSEQ = SEQ(CURRSTEP)
    CURRSTATE = FORWARD
    GOSUB SETSTATE
    GOTO OUTLOOP
REVNEXT
    CURRSTEP = (CURRSTEP - 1)
    IF CURRSTEP < > 15 THEN REVSTILL
    CURRSTEP = 5
REVSTILL
    CURRSEQ = SEQ(CURRSTEP)
    CURRSTATE = REVS
    GOSUB SETSTATE
    GOTO OUTLOOP
RELNEXT
    CURRSTEP = 0
    CURRSEQ = %000
    CURRSTATE = RELEASE
    GOSUB SETSTATE
    GOTO OUTLOOP
HOLDNEXT
    CURRSTEP = ((5-((CURRSTEP+4)//6))/3)*3   'Do not change this!!
    CURRSEQ = HOLDSEQ((CURRSTEP)
    CURRSTATE = HOLD
    GOSUB SETSTATE
    GOTO OUTLOOP
SETSTATE
    OUT7 = CURRSEQ.BIT2      'Front Output Pin
    OUT12 = CURRSEQ.BIT1     'Middle Output Pin
    OUT11 = CURRSEQ.BIT0     'Rear Output Pin
RETURN
SPEEDCHECK
    HIGH SPEEDPOTIN              'bring the pin up to 5 Vdc
    PAUSE 1                      ' wait for cap to discharge
    RCTIME SPEEDPOTIN, 1, POTVAL  ' measure discharge time
```

```
                                    -continued

SPEED = (POTVAL/POTCONST)+SPEEDMIN
            'debug cls, "potval=", dec potval, ",speed=", dec speed, cr
            return
        RETURN
        SERVOCHECK
            HIGH JOYSTICKPIN                        ' bring the pin up to 5 Vdc
            PAUSE 1                                 'wait for cap to discharge
            RCTIME JOYSTICKPIN, 1, JOYVAL,          'measure discharge time
            PULSOUT DUMMYPIN, (JOYMAX + 300 – JOYVAL)
                                                    ' make all measurements equal time
            PULSEWIDTH = (JOYVAL/JOYCONST)+PULSEMIN
            'debug "val=", dec joyval, ",delay=", dec joymax–joyval, ",pw=",
                dec pulsewidth, cr
            return
        RETURN
        SERVOPULSE
        PULSOUT SERVOUTPIN, PULSEWIDTH
        'pulsout DUMMYPIN, pulsemax–pulsewidth
        RETURN
```

It will be understood that other microprocessors could be substituted for BASIC Stamp microcontroller U and other, higher lever languages such as C or Pascal used to write appropriate software to control robot 10 in accordance with the present invention.

It will be further understood that various details of the invention may be changed without departing from the scope of the invention. Furthermore, the foregoing description is for the purpose of illustration only, and not for the purpose of limitation—the invention being defined by the claims.

What is claimed is:

1. A robotic apparatus adapted for locomotion in an enclosed space comprising:
    (a) a front segment including a front work-energy transfer device mounted thereto in operative communication with a power supply source, a plurality of front radial displacement members extending radially outwardly with respect to the front segment, and a front mechanical linkage interconnecting the front work-energy transfer device and each front radial displacement member to translate axial motion of the front work-energy transfer device into radial motion of each front radial displacement member;
    (b) a medial segment including first and second medial work-energy transfer devices mounted thereto in operative communication with the power supply source, the first medial work-energy transfer device including a first axial translation member and the second medial work-energy transfer device including a second axial translation member disposed in opposing axia relation to the first axial translation member to enable expansion and contraction of an overall length of the medial segment;
    (c) a first flexible coupling interconnecting the front segment and the first axi; translation member;
    (d) a rear segment including a rear work-energy transfer device mounted thereto in operative communication with the power supply source, a plurality of rear radial displacement members extending radially outwardly with respect to the rear segment, and a rear mechanical linkage interconnecting the rear work-energy transfer device and each rear radial displacement member to translate axial motion of the rear work-energy transfer device into radial motion of each rear radial displacement member; and
    (e) a second flexible coupling interconnecting the second axial translation member and the rear segment.

2. The robotic apparatus according to claim 1 wherein each of the work-energy transfer devices includes a linear actuator.

3. The robotic apparatus according to claim 2 wherein each of the front and rear work-energy transfer devices includes a reverse-action pneumatic cylinder and each of the first and second medial work-energy transfer devices includes a normal-action pneumatic cylinder.

4. The robotic apparatus according to claim 2 wherein each of the work-energy transfer devices includes a double-acting pneumatic cylinder.

5. The robotic apparatus according to claim 1 wherein at least one of the work-energy transfer devices includes a pneumatic cylinder.

6. The robotic apparatus according to claim 1 wherein at least one of the work-energy transfer devices includes a hydraulic cylinder.

7. The robotic apparatus according to claim 1 wherein at least one of the work-energy transfer devices includes a solenoid in driving communication with a reciprocative plunger member.

8. The robotic apparatus according to claim 1 comprising a sensing device communicating with an electrical power source.

9. The robotic apparatus according to claim 1 comprising a manipulative instrument communicating with an instrument power source.

10. The robotic apparatus according to claim 1 wherein:
    (a) the front segment includes a plurality of front gripping members, each front gripping member attached to a corresponding one of the plurality of front radial displacement members; and
    (b) the rear segment includes a plurality of rear gripping members, each rear gripping member attached to a corresponding one of the plurality of rear radial displacement members.

11. A robotic apparatus adapted for locomotion in an enclosed space comprising:
    (a) a plurality of leveraging segments, wherein each leveraging segment includes a leveraging segment work-energy transfer device mounted thereto in operative communication with a power supply source, a plurality of radial displacement members extending radially outwardly with respect to each leveraging segment, and a mechanical linkage interconnecting the leveraging segment work-energy transfer device and each radial displacement member to translate axial motion of the leveraging segment work-energy transfer device into radial motion of each radial displacement member;

(b) a plurality of locomotive segments, wherein each locomotive segment includes first and second locomotive segment work-energy transfer devices mounted thereto in operative communication with the power supply source, the first locomotive segment work-energy transfer device including a first displacement member and the second locomotive segment work-energy transfer device including a second displacement member disposed in opposing axial relation to the first displacement member to enable expansion and contraction of an overall length of the medial segment; and (c) a plurality of flexible couplings interconnecting the leveraging segments and the first and second displacement members of the locomotive segments.

12. The robotic apparatus according to claim 11 wherein at least one of the leveraging segments comprises a plurality of gripping members, each gripping member attached to a corresponding one of the plurality of radial displacement members of the at least one leveraging segment.

13. A robotic apparatus adapted for locomotion in an enclosed space comprising:

(a) a front segment including a front frame, a front work-energy transfer device mounted to the front frame in operative communication with a power supply source and including a front displacement member, a plurality of front leg members extending radially outwardly with respect to a central longitudinal axis of the front segment, and a front mechanical linkage interconnecting the front displacement member and each front leg member to translate axial motion of the front displacement member into radial motion of each front leg member;

(b) a medial segment including a medial frame, a first medial work-energy transfer device mounted to the medial frame in operative communication with the power supply source and including a first medial displacement member, and a second medial work-energy transfer device mounted to the medial frame in operative communication with the power supply source and including a second medial displacement member;

(c) a first flexible coupling interconnecting the front segment and the medial segment;

(d) a rear segment including a rear frame, a rear work-energy transfer device mounted to the rear frame in operative communication with the power supply source and including a rear displacement member, a plurality of rear leg members extending radially outwardly with respect to a central longitudinal axis of the rear segment, and a rear mechanical linkage interconnecting the rear displacement member and each rear leg member to translate axial motion of the rear displacement member into radial motion of each rear leg member; and (e) a second flexible coupling interconnecting the medial segment and the rear segment.

14. The robotic apparatus according to claim 13 wherein at least one of the work-energy transfer devices includes a pneumatic cylinder communicating with a compressed air supply source, and wherein the displacement member operatively corresponding to the pneumatic cylinder includes a reciprocative piston rod.

15. The robotic apparatus according to claim 13 wherein each of the front and rearwork-energy transfer devices includes a pneumatic cylinder and each of the first and second medial work-energy transfer devices includes a solenoid.

16. The robotic apparatus according to claim 13 wherein each of the front and rearwork-energy transfer devices includes a solenoid and each of the first and second medial work-energy transfer devices includes a pneumatic cylinder.

17. The robotic apparatus according to claim 13 wherein the frictional surface of each of the front and rear foot members is a resilient pad.

18. The robotic apparatus according to claim 13 wherein the front mechanical linkage includes a plurality of front bracket arms, each front bracket arm respectively connected to the front displacement member, to a corresponding one of the front leg members and to a corresponding one of a plurality of pivot points of the front frame.

19. The robotic apparatus according to claim 13 wherein the front mechanical linkage includes a central bracket connected to the front displacement member, a plurality of radial brackets attached to the front frame, and a plurality of bracket arms, each bracket arm pivotably connected to the central bracket, to a corresponding one of the radial brackets and to a corresponding one of the front leg members.

20. The robotic apparatus according to claim 13 wherein each of the first and second flexible couplings includes a tubular member.

21. The robotic apparatus according to claim 13 further comprising a plurality bumper members mounted to the front and rear segments.

22. The robotic apparatus according to claim 13 further comprising a sensing device mounted thereto.

23. The robotic apparatus according to claim 22 wherein the sensing device is a video camera.

24. The robotic apparatus according to claim 13 further comprising an instrument mounted thereto.

25. The robotic apparatus according to claim 13 further comprising a nose module attached to the front segment.

26. The robotic apparatus according to claim 25 further comprising a sensing device mounted to the nose module.

27. The robotic apparatus according to claim 26 wherein the nose module includes a transparent enclosure and the sensing device is disposed with the transparent enclosure.

28. The robotic apparatus according to claim 25 further comprising a light source mounted to the nose module.

29. The robotic apparatus according to claim 13 wherein:

(a) the front segment comprises a plurality of front foot members, each front foot member including a frictional surface and attached to a corresponding one of the plurality of front leg members; and (b) the rear segment comprises a plurality of rear foot members, each rearfoot member including a frictional surface and attached to a corresponding one of the plurality of rear leg members.

30. A robotic apparatus adapted for locomotion in an enclosed space comprising:

(a) a plurality of leveraging segments, wherein each leveraging segment includes a frame, a leveraging segment work-energy transfer device mounted to the frame in operative communication with a power supply source and including a leveraging segment displacement member, a plurality of leg members extending radially outwardly with respect to a central longitudinal axis of each leveraging segment, and a mechanical linkage interconnecting the leveraging segment displacement member and each leg member to translate axial motion of the leveraging segment displacement member into radial motion of each leg member;

(b) a plurality of locomotive segments, wherein each locomotive segment includes a frame, a first locomotive segment work-energy transfer device mounted to the frame in operative communication with the power supply source and including a first locomotive segment displacement member, and a second locomotive segment work-energy transfer device mounted to the frame in operative communication with the power supply source and including a medial locomotive segment displacement member; and (c) a plurality of flexible couplings interconnecting the leveraging and locomotive segments.

31. The robotic apparatus according to claim 30 wherein at least one of the leveraging segments comprises a plurality of foot members, each foot member including a frictional surface and attached to a corresponding one of the plurality of leg members of the at least one leveraging segment.

32. A modular device adapted to enable forcible contact and stabilization of a robotic apparatus with respect to an enclosure through which the robotic apparatus crawls, the modular device comprising:

(a) a structural frame;

(b) a linearly actuating device mounted to the structural frame in operative communication with a power supply source and with a axially reciprocative displacement member;

(c) a plurality of leg members extending radially outwardly with respect to a central longitudinal axis of the structural frame;

(d) a plurality of foot members, each foot member including a frictional surface and attached to a corresponding one of the plurality of leg members; and (e) a mechanical linkage assembly interconnecting the displacement member and each leg member to translate axial motion of the displacement member into radial motion of each leg member.

33. The modular device according to claim 32 wherein the structural frame comprises a plurality of axially-oriented support members connected to a plurality of radially-oriented support members.

34. The modular device according to claim 33 wherein the linearly actuating device is mounted to at least one of the radially-oriented support plates.

35. The modular device according to claim 33 wherein at least one of the leg members slidably extends through a bore of one of the axially-oriented support members.

36. The modular device according to claim 32 wherein the linearly actuating device includes a fluid-operated cylinder, the power supply source includes a fluid supply source, and the displacement member includes a piston rod.

37. The modular device according to claim 32 wherein the linearly actuating device includes a reverse-acting device.

38. The modular device according to claim 32 wherein the linearly actuating device includes a double-acting device.

39. The modular device according to claim 32 wherein the mechanical linkage assembly includes a plurality of bracket arms, and each bracket arm is respectively connected to the displacement member, to a corresponding one of the leg members and to a corresponding one of a plurality of pivot points of the frame.

40. The modular device according to claim 32 wherein the mechanical linkage assembly includes a central bracket connected to the displacement member, a plurality of radial brackets attached to the frame, and a plurality of bracket arms, and each bracket arm is pivotally connected to the central bracket, to a corresponding one of the radial brackets and to a corresponding one of the leg members.

41. A robotic apparatus adapted for locomotion in an enclosed space comprising:

(a) a front segment including a front work-energy transfer device mounted thereto in operative communication with a power supply source, a plurality of front radial displacement members extending radially outwardly with respect to the front segment, a plurality of front gripping members, each front gripping member attached to a corresponding one of the plurality of front radial displacement members, and a front mechanical linkage interconnecting the front work-energy transfer device and each front radial displacement member to translate axial motion of the front work-energy transfer device into radial motion of each front radial displacement member;

(b) a medial segment including first and second medial work-energy transfer devices mounted thereto in operative communication with the power supply source, the first medial work-energy transfer device including a first axial translation member and the second medial work-energy transfer device including a second axial translation member disposed in opposing axial relation to the first axial translation member to enable expansion and contraction of an overall length of the medial segment;

(c) a first flexible coupling interconnecting the front segment and the first axial translation member;

(d) a rear segment including a rear work-energy transfer device mounted thereto in operative communication with the power supply source, a plurality of rear radial displacement members extending radially outwardly with respect to the rear segment, a plurality of rear gripping members, each rear gripping member attached to a corresponding one of the plurality of rear radial displacement members, and a rear mechanical linkage interconnecting the rear work-energy transfer device and each rear radial displacement member to translate axial motion of the rear work-energy transfer device into radial motion of each rear radial displacement member; and (e) a second flexible coupling interconnecting the second axial translation member and the rear segment.

42. The robotic apparatus according to claim 41 comprising a structural frame, wherein the structural frame comprises a plurality of axially-oriented support members connected to a plurality of radially-oriented support members.

43. The robotic apparatus according to claim 42 wherein at least one of the work-energy transfer devices is mounted to at least one of the radially-oriented support members.

44. The robotic apparatus according to claim 41 wherein the first and second medial work-energy transfer devices each includes a fluid-operated cylinder, the power supply source includes a fluid supply source, and the first and second axial translation members each include a piston rod.

45. The robotic apparatus according to claim 41 wherein at least one of the work-energy transfer devices includes a normal-acting device.

46. The robotic apparatus according to claim 41 wherein at least one of the work-energy transfer devices includes a double-acting device.

47. A robotic apparatus adapted for locomotion in an enclosed space comprising:

(a) a plurality of leveraging segments, wherein each leveraging segment includes a leveraging segment work-energy transfer device mounted thereto in operative communication with a power supply source, a plurality of radial displacement members extending radially outwardly with respect to each leveraging segment, a plurality of gripping members, each gripping member attached to a corresponding one of the radial displacement members, and a mechanical linkage interconnecting the leveraging segment work-energy transfer device and each radial displacement member to translate axial motion of the leveraging segment work-energy transfer device into radial motion of each radial displacement member;

(b) a plurality of locomotive segments, wherein each locomotive segment includes first and second locomotive segment work-energy transfer devices mounted thereto in operative communication with the power supply source, the first locomotive segment work-energy transfer device including a first displacement member and the second locomotive segment work-energy transfer device including a second displacement member disposed in opposing axial relation to the first displacement member to enable expansion and contraction of an overall length of the medial segment; and (c) a plurality of flexible couplings interconnecting the leveraging segments and the first and second displacement members of the locomotive segments.

48. A robotic apparatus adapted for locomotion in an enclosed space comprising:

(a) a front segment including a front frame, a front work-energy transfer device mounted to the front frame in operative communication with a power supply source and including a front displacement member, a plurality of front leg members extending radially outwardly with respect to a central longitudinal axis of the front segment, a plurality of front foot members, each front foot member including a frictional surface and attached to a corresponding one of the plurality of front leg members, and a front mechanical linkage interconnecting the front displacement member and each front leg member to translate axial motion of the front displacement member into radial motion of each front leg member;

(b) a medial segment including a medial frame, a first medial work-energy transfer device mounted to the medial frame in operative communication with the power supply source and including a first medial displacement member, and a second medial work-energy transfer device mounted to the medial frame in operative communication with the power supply source and including a second medial displacement member;

(c) a first flexible coupling interconnecting the front segment and the medial segment;

(d) a rear segment including a rear frame, a rear work-energy transfer device mounted to the rear frame in operative communication with the power supply source and including a rear displacement member, a plurality of rear leg members extending radially outwardly with respect to a central longitudinal axis of the rear segment, a plurality of rear foot members, each rear foot member including a frictional surface and attached to a corresponding one of the plurality of rear leg members, and a rear mechanical linkage interconnecting the rear displacement member and each rear leg member to translate axial motion of the rear displacement member into radial motion of each rear leg member; and (e) a second flexible coupling interconnecting the medial segment and the rear segment.

49. A robotic apparatus adapted for locomotion in an enclosed space comprising:

(a) a plurality of leveraging segments, wherein each leveraging segment includes a frame, a leveraging segment work-energy transfer device mounted to the frame in operative communication with a power supply source and including a leveraging segment displacement member, a plurality of leg members extending radially outwardly with respect to a central longitudinal axis of each leveraging segment, a plurality of foot members, each foot member including a frictional surface and attached to a corresponding one of the plurality of leg members, and a mechanical linkage interconnecting the leveraging segment displacement member and each leg member to translate axial motion of the leveraging segment displacement member into radial motion of each leg member;

(b) a plurality of locomotive segments, wherein each locomotive segment includes a frame, a first locomotive segment work-energy transfer device mounted to the frame in operative communication with the power supply source and including a first locomotive segment displacement member, and a second locomotive segment work-energy transfer device mounted to the frame in operative communication with the power supply source and including a medial locomotive segment displacement member; and (c) a plurality of flexible couplings interconnecting the leveraging and locomotive segments.

* * * * *